(12) United States Patent
Okuda et al.

(10) Patent No.: US 9,487,668 B2
(45) Date of Patent: Nov. 8, 2016

(54) INK SET AND IMAGE PRINTING METHOD

(71) Applicant: Seiko Epson Corporation, Tokyo (JP)

(72) Inventors: Ippei Okuda, Shiojiri (JP); Tsuyoshi Sano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/755,123

(22) Filed: Jun. 30, 2015

(65) Prior Publication Data
US 2015/0299488 A1 Oct. 22, 2015

Related U.S. Application Data

(62) Division of application No. 14/517,147, filed on Oct. 17, 2014, now Pat. No. 9,096,771, which is a division of application No. 13/422,215, filed on Mar. 16, 2012, now Pat. No. 8,888,265.

(30) Foreign Application Priority Data

Mar. 16, 2011 (JP) .................................. 2011-058343
Mar. 30, 2011 (JP) .................................. 2011-074381

(51) Int. Cl.
C09D 11/40 (2014.01)
C09D 11/10 (2014.01)
B41J 2/01 (2006.01)
C09D 133/00 (2006.01)
C09D 175/04 (2006.01)
C09D 11/106 (2014.01)
C09D 11/108 (2014.01)
C09D 11/12 (2006.01)

(52) U.S. Cl.
CPC .................. *C09D 11/40* (2013.01); *B41J 2/01* (2013.01); *C09D 11/10* (2013.01); *C09D 11/106* (2013.01); *C09D 11/108* (2013.01); *C09D 11/12* (2013.01); *C09D 133/00* (2013.01); *C09D 175/04* (2013.01)

(58) Field of Classification Search
CPC ..... C09D 11/40; C09D 11/108; C09D 11/12; C09D 11/106; C09D 33/001; C09D 11/10; C09D 175/04; C09D 133/00; B41J 2/01; B41J 2/2107; B41J 2/2056; B41J 2/21; B41J 2/2114; B41J 2/2117
USPC ............................. 347/20, 95, 96, 100, 101
See application file for complete search history.

(56) References Cited

U.S. PATENT DOCUMENTS

| | | | |
|---|---|---|---|
| 4,880,465 A | 11/1989 | Loria et al. | |
| 5,112,398 A | 5/1992 | Kruse | |
| 7,798,625 B2 | 9/2010 | Takabayashi | |
| 7,919,545 B2 | 4/2011 | Shimohara et al. | |
| 8,888,265 B2 | 11/2014 | Okuda et al. | |
| 9,096,771 B2 | 8/2015 | Okuda et al. | |
| 2003/0188665 A1 | 10/2003 | Sano et al. | |
| 2004/0196351 A1* | 10/2004 | Kida | B41M 7/0027 347/105 |
| 2006/0275606 A1 | 12/2006 | Mizutani | |
| 2007/0044684 A1 | 3/2007 | Nakano et al. | |
| 2007/0196647 A1* | 8/2007 | Yokoyama | B32B 7/12 428/355 AC |
| 2008/0233363 A1* | 9/2008 | Goto | C09D 11/30 428/195.1 |
| 2009/0220754 A1 | 9/2009 | Yatake | |
| 2009/0246479 A1 | 10/2009 | Mukai et al. | |
| 2009/0304927 A1 | 12/2009 | Kamibayashi et al. | |
| 2010/0080962 A1 | 4/2010 | Koganehira et al. | |
| 2010/0091052 A1 | 4/2010 | Ogawa et al. | |
| 2010/0190922 A1 | 7/2010 | Shinozaki et al. | |
| 2011/0300298 A1* | 12/2011 | Kamibayashi | C09D 11/54 427/256 |
| 2012/0236070 A1 | 9/2012 | Okuda et al. | |
| 2015/0035898 A1 | 2/2015 | Okuda et al. | |

FOREIGN PATENT DOCUMENTS

| | | |
|---|---|---|
| EP | 2 154 210 A2 | 2/2010 |
| EP | 2 053 099 B1 | 12/2010 |
| JP | 2001-171095 A | 6/2001 |
| JP | 2002-038063 A | 2/2002 |
| JP | 2004-002698 A | 1/2004 |
| JP | 2005-028844 A | 2/2005 |
| JP | 2005-048108 A | 2/2005 |
| JP | 2006-089559 A | 4/2006 |
| JP | 2006-315363 A | 11/2006 |
| JP | 2007-194175 A | 8/2007 |
| JP | 2008-120846 A | 5/2008 |
| JP | 2009-137124 A | 6/2009 |
| JP | 2009-160868 A | 7/2009 |
| JP | 2009-235386 A | 10/2009 |
| JP | 2009-242441 A | 10/2009 |
| JP | 2010-115901 A | 5/2010 |
| JP | 2010-174100 A | 8/2010 |

OTHER PUBLICATIONS

U.S. Appl. No. 13/422,215, filed Mar. 16, 2012, Ink Set and Image Printing Method.
U.S. Appl. No. 14/517,147, filed Oct. 17, 2014, Ink Set and Image Printing Method.

\* cited by examiner

Primary Examiner — Julian Huffman
Assistant Examiner — Michael Konczal
(74) Attorney, Agent, or Firm — Nutter McClennen & Fish LLP; John J. Penny, Jr.; Joshua I. Rudawitz

(57) ABSTRACT

An ink set includes a first ink that contains a white material and a first resin; and a second ink that contains a color material other than the white material and a second resin, wherein the first resin includes a component (A) causing cracks when resin of 0.5 g is dropped onto a slide glass and is dried at a temperature of 50° C. and a humidity of 0% RH for 10 minutes, and wherein the second resin includes a component (B) of at least one of polyolefin wax and ethylene vinyl acetate resin.

5 Claims, No Drawings

INK SET AND IMAGE PRINTING METHOD

This application is a divisional of and claims priority to U.S. patent application Ser. No. 14/517,147 filed Oct. 17, 2014, which is a divisional of U.S. patent application Ser. No. 13/422,215, filed Mar. 16, 2012 and which issued as U.S. Pat. No. 8,888,265 on Nov. 18, 2014 and claims priority under 35 U.S.C. §119 to Japanese Patent Application No. 2011-058343 filed Mar. 16, 2011, as well as Japanese Patent Application No. 2011-074381 filed on Mar. 30, 2011, each of which are hereby incorporated by reference in its entirety.

BACKGROUND

1. Technical Field

The present invention relates to an ink set and an image printing method using the same.

2. Related Art

Hitherto, it is known that ink is attached to a printing medium to form a desired image using various printing methods. The ink used to form the image is prepared in which various components are added according to the use thereof. For example, in JP-A-2008-120846, an ultraviolet curable overprinting ink composition used to protect a printing layer is described.

In JP-A-2007-194175, conductive pattern ink used to form a line pattern using an ink jet method is described.

However, in the image attached to the printing medium, cracks may occur according to the components included in the ink or the printing methods. JP-A-2008-120846 describes that various oligomers or monomers are added to an overcoating ink component, to reduce such a problem. JP-A-2007-194175 describes that a nonionic compound such as polyethylene glycol is added to the conductive pattern ink to reduce cracks of the conductive pattern.

However, as described in JP-A-2008-120846 and JP-A-2007-194175, when the component for reducing the cracks of the image is added to the ink composition, friction resistance of the image may be decreased.

To solve such a problem, for example, a component for improving the friction resistance of the image may be further added to the ink composition. However, according to the added component, there is a case where it is difficult to satisfy both of improvement of friction resistance of the image and reduction of cracks of the image.

When a content ratio of resin and the like in the ink becomes high so as to improve the friction resistance of the image and to reduce the cracks, the components included in the ink may easily cohere, and ejection stability of an ink jet printing device may be decreased. Particularly, in ink including a white material, when the content ratio of resin in the ink becomes high, there is a problem in that the white ink easily coheres.

SUMMARY

An advantage of some aspects of the invention is to provide an ink set with excellent ejection stability, which can reduce occurrence of cracks and can print an image with excellent friction resistance.

APPLICATION EXAMPLE 1

According to an embodiment of the invention, there is provided an ink set including: a first ink that contains a white material and a first resin; and a second ink that contains a color material other than the white material and a second resin, wherein the first resin includes a component (A) causing cracks when 0.5 g of the same is dropped onto a slide glass and is dried at a temperature of 50° C. and a humidity of 0% RH for 10 minutes, and wherein the second resin includes a component (B) of at least one of polyolefin wax and ethylene vinyl acetate resin.

APPLICATION EXAMPLE 2

According to another embodiment of the invention, there is provided an ink set including: a first ink that contains a white material and a first resin; and a second ink that contains a color material other than the white material, and a second resin, wherein the first resin includes a component (A) of at least one of fluorene resin and styrene acryl resin, and the second resin includes a component (B) of at least one of polyolefin wax and ethylene vinyl acetate resin.

APPLICATION EXAMPLE 3

In Application Example 1, the component (A) may be at least one of fluorene resin and styrene acryl resin.

APPLICATION EXAMPLE 4

In any one of Application Example 1 to Application Example 3, a content of the component (A) in the first ink may be equal to or more than 1 mass % and less than 7 mass %.

APPLICATION EXAMPLE 5

In any one of Application Example 1 to Application Example 4, a ratio (W2/W1) of a content [W1] of the component (A) in the first ink and a content [W2] of the component (B) in the second ink may be equal to higher than 0.25 and equal to or lower than 1.5.

APPLICATION EXAMPLE 6

In any one of Application Example 1 to Application Example 5, an average particle diameter of the polyolefin wax may be equal to or more than 100 nm and equal to or less than 200 nm.

APPLICATION EXAMPLE 7

In any one of Application Example 1 to Application Example 6, the first resin may further include the component (B), and a content of the component (B) in the first ink may be equal to or less than 2 mass %.

APPLICATION EXAMPLE 8

In any one of Application Example 1 to Application Example 7, a content of the first resin in the first ink may be equal to or more than 1 mass % and less than 6 mass %.

APPLICATION EXAMPLE 9

According to still another embodiment of the invention, there is provided an image printing method using the ink set according to any one of Application Example 1 to Application Example 8, the method including: ejecting liquid droplets of the first ink to attach the liquid droplets of the first ink to a printing medium; and ejecting liquid droplets of the second ink to attach the liquid droplets of the second ink onto the liquid droplets of the first ink attached to the printing medium.

APPLICATION EXAMPLE 10

According to still another embodiment of the invention, there is provided an image printing device which prints an image using the ink set according to any one of Application Example 1 to Application Example 8.

APPLICATION EXAMPLE 11

According to still another embodiment of the invention there is provided an ink set including: a first ink that contains a white material and a first resin; second ink that contains a color material other than the white material; and a third ink that does not contain a color material and contains a second resin, wherein the first resin includes a component (A) of at least one of fluorene resin and styrene acryl resin, and wherein the second resin includes a component (B) of at least one of polyolefin wax and ethylene vinyl acetate resin.

APPLICATION EXAMPLE 12

In Application Example 11, a content of the first resin in the white ink may be equal to or more than 1 mass % and equal to less than 7 mass % in term of solid content.

APPLICATION EXAMPLE 13

In any one of Application Example 11 and Application Example 12, a content of the second resin in clear ink may be equal to or more than 3 mass % and equal to less than 10 mass % in term of solid content.

APPLICATION EXAMPLE 14

In any one of Application Example 11 to Application Example 13, the ink set may be provided in a liquid droplet ejecting device, and the ink set may be used in an image forming method of ejecting liquid droplets of the white ink and liquid droplets of clear ink substantially at the same time such that the droplets of the white ink and the droplets of the clear ink are caused to come into contact with and attach onto a printing medium, and then ejecting liquid droplets of color ink to attach the liquid droplets onto the liquid droplets of the white ink and the liquid droplets of the clear ink attached to the printing medium.

APPLICATION EXAMPLE 15

In any one of Application Example 11 to Application Example 13, the ink set may be provided in a liquid droplet ejecting device, and the ink set may be used in an image forming method of ejecting droplets of the white ink to attach the liquid droplets of the white ink to a printing medium, and then ejecting liquid droplets of clear ink and liquid droplets of color ink substantially at the same time such that the liquid droplets of the clear ink and the droplets of the color ink are caused to come into contact with and attach onto the liquid droplets of the white ink attached to the printing medium.

APPLICATION EXAMPLE 16

In Application Example 14 or Application Example 15, a ratio ($T_{WB}/T_{WA}$) of a total amount ($T_{WA}$) of the component (A) on the printing medium and a total amount ($T_{WB}$) of the component (B) on the printing medium may be equal to or higher than 0.2 and equal to or lower than 1.7.

APPLICATION EXAMPLE 17

In any one of Application Example 11 to Application Example 16, an average particle diameter of the polyolefin wax may be equal to or than 100 nm and equal to or less than 200 nm.

APPLICATION EXAMPLE 18

According to still another embodiment of the invention, there is provided an image printing device which prints an image using the ink set according to any one of Application Example 11 to Application Example 17.

DESCRIPTION OF EXEMPLARY EMBODIMENTS

Hereinafter, a first embodiment according to the invention will be described. In the embodiments to be described below, an example of the invention will be described. The invention is not limited to the following embodiments, and may be various modifications embodied in the scope which does not deviate from the concept of the invention.

1. Ink Set

An ink set according to an embodiment of the invention includes a first ink and a second ink.

Components included in each ink according to the embodiment will be described in detail.

1.1. First Ink

The first ink according to the embodiment contains a white material and a first resin. The first ink is used as a so-called "white ink". In the invention, the "white ink" that brightness ($L^*$) and chromaticity ($a^*$ and $b^*$) of ink ejected on EPSON pure photography paper (glossy) (manufactured by Seiko Epson, Corp.) by a duty of 100% or higher are in the range of $70 \leq L^* \leq 100$, $-4.5 \leq a^* \leq 2$, and $-6 \leq b^* \leq 2.5$ when measurement is performed in conditions of a light source of D50, a field of view of 2°, a concentration of DIN NB, a white standard of Abs, a filter of No, and a measurement mode of Reflectance, using a spectrum photometer of Spectrolino (product name, manufactured by GretagMacbeth, Co., Ltd.).

In the specification, a "duty value" is a value calculated in the following formula.

$$\text{duty}(\%) = \text{number of actually ejected dots}/(\text{longitudinal resolution} \times \text{transverse resolution}) \times 100$$

(In the formula, the "number of actually ejected dots" is the number of actually ejected dots per unit area, each of the "longitudinal resolution" and the "transverse resolution" is resolution per unit area.)

Next, components included in the first ink will be described in detail.

1.1.1. White Material

The first ink according to the embodiment contains a white material. The white material may be, for example, metal oxide, barium sulfide, and calcium carbonate. The metal oxide may be, for example, titanium dioxide, zinc oxide, silica, alumina, or magnesium oxide. The white material may include particles having a hollow structure, the particles having the hollow structure are not particular limited, and known particles may be used. The particles having the hollow structure may be preferably, for example, particles described in the specification of U.S. Pat. No. 4,880,465. The white material contained in the first ink of the embodiment may be preferably titanium dioxide among them from the viewpoint of white chromaticity and friction resistance.

The content of the white material (solid content) is preferably equal to or more than 1 mass % and equal to or less than 20 mass %, and more preferably equal to or more than 5 mass % and equal to or less than 15%, with respect to the total mass of the first ink. When the content of the white material is over the range, nozzle clogging or the like of an ink jet printing device may occur. Meanwhile, when the content of the white material is less than the range, a color concentration such as white chromaticity may be insufficient.

An average particle diameter based on volume of the white material (hereinafter referred to as an "average particle diameter") is preferably equal to or more than 30 nm and equal to or less than 600 nm, and more preferably, equal to or more than 200 nm and equal to or less than 400 nm. When the average particle diameter of the white material is over the range, dispersion stability may be decreased by particle precipitation or the like, and reliability of clogging or the like of an ink jet printing head may be decreased. Meanwhile, even when the average particle diameter of the white material is less than the range, the white chromaticity may be insufficient.

The average particle diameter of the white material may be measured by a particle size distribution measuring device using a laser diffractive scattering method as a measurement principle. The particle size distribution measuring device may be for example, a particle size distribution meter (for example, "MicroTrac UPA" manufactured by Nikkiso Co., Ltd.) using a dynamic light scattering method as a measurement principle.

1.1.2. First Resin

The first ink according to the embodiment contains the first resin. One of the functions of the first resin is to fix the first ink to a printing medium.The content of the first resin is preferably equal to or more than 1 mass % and less than 7 mass %, more preferably equal to or more than 1 mass % and equal to or less than 6 mass %, and particularly preferably equal to or more than 3 mass % and equal to or less than 6 mass %, with respect to the total mass of the first ink. When the content of the first resin falls within the range, ejection stability of the first ink is satisfactory when the first ink is applied to the ink jet printing device. Meanwhile, when the content of the first resin is over the range, the white material may cohere, or nozzle clogging or the like may occur to decrease the ejection stability when the first ink is applied to the ink jet printing device. When the content of the first resin is less than the range, the fixing property of the first ink to the printing medium may be insufficient. The content of the first ink is an amount in term of solid content.

Hereinafter, the components included in the first resin will be described. The first resin is a concept including one or more kinds of resin, and "the first resin includes . . . ", "the first resin contains . . . ", and "the first resin implies . . . " do not mean that it is included in the structure of resin, but it is resin corresponding to the first resin.

(1) Component (A)

The first resin contains a component (A). The component (A) is resin which causes cracks when resin of 0.5 g is dropped onto a slide glass (for example, MICRO SLIDE GLASS S-7213 manufactured by Matsunami Glass Indutries Co., Ltd) and is dried at a temperature of 50° C. and a humidity of 0% RH for 10 minutes.

A specific example of the component (A) may be at least one of fluorene resin and styrene acryl resin.The component (A) has a function of fixing the first ink to the printing medium, and also has a function of significantly improving friction resistance of the image formed on the printing medium.

When the component (A) is dried, cracks may occur. The cracks of the component (A) may be determined according to whether or not there are cracks of the dried component (A) when the component (A) of 0.5 g is dropped, for example, onto a slide glass (MICRO SLIDE GLASS S-7213 manufactured by Matsunami Glass Indutries Co., Ltd) and is dried at a temperature of 50° C. and a humidity of 0% RH for 10 minutes. The component (A) may be dried using, for example, the known constant temperature and constant humidity bath or the like.

As the fluorene resin used as the component (A), resin having a fluorene structure is not particularly limited, and may be obtained by copolymerizing, for example, the following monomer units (a) to (d).

(a) isophorone diisocyanate (CAS No. 4098-71-9)
(b) 4,4'-(9-fluorenylidene)bis-[2-(phenoxy)ethanol] (CAS No. 117344-32-8)
(c) 3-hydroxy-2-(hydroxymethyl)-2-methylpropionate (CAS No. 4767-03-7)
(d) triethylamine (CAS No. 121-44-8)

As the fluorene resin used as the component (A), resin containing monomer having a fluorene structure represented by 4,4'-(9-fluorenylidene)bis-[2-(phenoxy)ethanol] (CAS No. 117344-32-8) is not particularly limited.

The styrene acryl resin used as the component (A) may be, for example, styrene-acrylate copolymer, styrene-methacrylate copolymer, styrene-methacrylate-acrylate ester copolymer, styrene-α-methylstyrene-acrylate copolymer, and styrene-α-methylstyrene-acrylate-acrylate ester copolymer. A type of copolymer may be any type of random copolymer, block copolymer, alternate copolymer, and graft copolymer.

The styrene acryl resin may be a commercially available product. A specific example of the commercially available product of styrene acryl resin may be Joncryl 62J (manufactured by BASF Japan, Co., Ltd).

Both of fluorene resin and acryl resin can improve friction resistance of the image formed by the first ink. However, particularly, when the fluorene resin is mixed with the first ink, it is possible to further improve the friction resistance of the image.

The content (solid content) of the component (A) is preferably equal to or more than 0.1 mass % and less than 7 mass %, more preferably equal to or more than 1 mass % and less than 7 mass %, even more preferably equal to or more than 1 mass % and less than 6 mass %, and particularly preferably equal to or more than 3 mass % and less than 6 mass % with the whole mass of the first ink. When the content of the component (A) falls within the range, the ejection stability is satisfactory when the first ink is applied to the ink jet printing head, and the friction resistance and fixing property of the printed image are satisfactory. Meanwhile, when the content of the component (A) is over the range, cracks may occur on the printed image, or the ejection stability of the ink jet printing head may be decreased. Meanwhile, when the content of the component (A) is less than the range, the friction resistance of the printed image may be decreased.

(2) Other Resin

The first resin may be only the component (A), but may also be the other resin in addition to the component (A).

One of functions of the other resin is to improve a dispersion property of the white material in the first ink in addition to the function of fixing the first ink to the printing medium. The other resin may be, for example, the known resin such as acryl resin, urethane resin, polyolefin resin, rosin deformed resin, terpene resin, polyester resin, polyamide resin, epoxy resin, vinyl chloride resin, vinyl chloride-acetate copolymer, and ethylene vinyl acetate resin, or the component (B) to be described later.

When the component (B) described in the following "1.2.2. Second Resin" is contained in the first ink, the content of the component (B) in the first ink is preferably equal to or less than 2 mass % ("equal to or less than 2 mass %" includes 0 mass %). The content of the component (B) in the first ink is more preferably equal to or less than 1 mass % (including 0 mass %), even more preferably equal to or less than 0.5 mass % (including 0 mass %), and even much more preferably equal to or less than 0.1 mass % (including 0 mass %). The component (B) having the effect of preventing cracks from occurring is contained in the second ink as much as possible, and the ejection stability of the first ink may be satisfactory.

From the viewpoint of the ejection stability, the total content of the first resin and the white material in the first ink is preferably equal to or less than 18 mass %, more preferably equal to or less than 16 mass %, and even more preferably equal to or less than 14 mass %, in term of solid content with respect to the whole mass of the first ink.

1.1.3. Other Components

The first ink according to the embodiment may contain an organic solvent. The first ink may contain various organic solvents. The organic solvent used in the first ink may be alkanediol, multivalent alcohol other than alkanediol, pyrrolidone derivatives, and the like.

The alkane diol may be, for example, 1,2-propanediol, 1,2-butanediol, 1,2-pentanediol, 1,2-hexanediol, 1,2-octanediol, 1,3-propanediol, 1,4-butanediol, 1,5-pentanediol, and 1,6-hexanediol. Among them, 1,2-akanediol is excellent in an effect of improving wettability of ink with respect to the printing medium to uniformly wet the printing medium, and thus it is possible to form an excellent image on the printing medium. When alkanediol is contained, the content thereof is preferably equal to more than 1 mass % and equal to or less than 20 mass % with respect to the total mass of the first ink.

Multivalent alcohol other than akanediol may be, for example, ethylene glycol, diethylene glycol, propylene glycol, dipropylene glycol, and glycerine. When the first ink is used in the ink jet printing device, multivalent alcohol other than alkanediol may be preferably used from the viewpoint of suppressing dry solidification of the ink on the nozzle face of the head to reduce clogging or unsatisfactory ejection. When multivalent alcohol other than alkanediol is contained, the content thereof is preferably equal to or more than 2 mass % and equal to or less than 20 mass % with respect to the whole mass of the first ink.

Pyrrolidone derivatives may be, for example, N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. Pyrrolidone derivatives may serve as a satisfactory solvent of resin. When pyrrolidone derivatives are contained, the content thereof is preferably equal to or more than 0.1 mass % and equal to or less than 25 mass % with respect to the whole mass of the first ink.

The first ink may contain a surfactant. The surfactant may be a silicon surfactant, acetylene glycol surfactant, and the like.

The silicon surfactant may be preferably polysiloxane compound, for example, polyether modified organosiloxane. More specifically, there are BYK-306, BYK-307, BYK-333, BYK-341, BYK-345, BYK-346, and BYK-348 (product name, manufactured by BYK-Chemie Japan Co., Ltd.), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (product name, manufactured by Shin-Etsu Chemical Co., Ltd.). The silicon surfactant may be preferably used from the viewpoint of an effect of uniform spread such that blur or spread of the first ink does not occur on the printing medium. When the silicon surfactant is contained, the content thereof is preferably equal to or more than 0.1 mass % and equal to or less than 1.5 mass % with respect to the whole mass of the first ink.

The acetylene glycol surfactant may be 2,4,7,9-tetramethyl-5-desine-4,7-diol, 3,6-dimethyl-4-octine-3,6-diol, 3,5-dimethyl-1-hexine-3-ol, and 2,4-dimethyl-5-hexine-3-ol. As the acetylene glycol surfactant, a commercially available product may be used, for example, Surfynol 104, 104E, 104H, 104A, 104BC, 104DPM, 104PA, 104PG-50, 104S, 420, 440, 465, 485, SE, SE-F, 504, 61, DF37, DF110D, CT111, CT121, CT131, CT136, TG, and GA (product name, manufactured by Air Products and Chemicals, INC.), and Orfin B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (product name, manufactured by Nissin Chemical Industry Co., Ltd.), and Acetylenol E00, E00P, E40, and E100 (product name, manufactured by Kawaken Fine Chemicals Co., Ltd.). The acetylene glycol surfactant is excellent in capability of appropriately keeping surface tension and interfacial tension as compared with other surfactants, and has characteristics in that there is substantially no foaming property. When the acetylene surfactant is contained, the content thereof is preferably equal to or more than 0.1 mass % and equal to or less than 1.0 mass % with respect to the whole mass of the first ink.

The first ink according to the embodiment may be so-called aqueous ink including water of 50 mass % or more. The aqueous ink has a little reaction property on a piezoelectric element used in the printing head or an organic binder included in the printing medium as compared with non-aqueous (solvent) ink (for example, see ink described in US Patent Application Publication No. 2007/0044684 as ink used in a print matter), and thus there is a case where it is possible to reduce melting or corrosion thereof. The aqueous ink may form an image excellent in a drying property as compared with the non-aqueous ink containing a lot of solvent with a high boiling point and a low viscosity. In the aqueous ink, a bad smell is suppressed as compared with the solvent ink, 50% or more of the composition is water, and thus there is an advantage that it is suitable for the environment.

The first ink according to the embodiment may contain a pH adjustment agent, an antiseptic agent, a fungicide, a corrosion inhibitor, a chelation agent, and the like. When the first ink according to the embodiment contains such compounds, characteristics thereof may be further improved.

The pH adjustment agent may be, for example, potassium dihydrogen phosphate, sodium dihydrogenphosphate, sodium hydroxide, lithium hydroxide, potassium hydroxide, ammonia, diethanolamine, triethanolamin, triisopropanolamine, potassium carbonate, sodium carbonate, and sodium bicarbonate.

The antiseptic agent and the fungicide may be, for example, sodium benzoate, pentachlorophenol sodium, 2-pyridinethiol-1-oxide sodium, sodium sorbate, sodium dehydroacetate, and 1,2-benzisothiazoline-3-on. The commercially available product may be Proxel XL2 and Proxel GXL (product name, manufactured by Avecia Co., Ltc.), Denicide CSA, NS-500W (product name, manufactured by Nagasechemtex Co., Ltd.), and the like.

The corrosion inhibitor may be, for example, benzotriazole.

The chelation agent may be, for example, ethylenediaminetetraacetate and salt thereof (ethylenediaminetetraacetate dihydrogen phosphate disodium salt).

The first ink according to the embodiment may be prepared in the same manner as pigment ink of the related art, using the known device of the related art such as a ball mill, a sand mill, an attritor, a basket mill, and a roll mill. At the time of preparation, it is preferable to remove coarse particles using a membrane filter, a mesh filter, or the like.

1.2. Second Ink

The second ink according to the embodiment contains color materials other than the white material described above, and a second resin. Hereinafter, the components included in the second ink will be described in detail.

1.2.1. Color Material

The second ink according to the embodiment contains the color materials (hereinafter, merely referred to as "color materials") other than the white material described above. The color materials may be, for example, dyes and pigments. The content of the color materials is preferably equal to or more than 1 mass % and equal to or less than 20 mass %, and more preferably equal to or more than 1 mass % and equal to or less than 15 mass %, with respect to the whole mass of the second ink.

(1) Pigment

Pigments usable in the embodiment are not particularly limited, and inorganic pigments or organic pigments may be used.

The inorganic pigments may be carbon block (C.I. pigment block 7) such as a furnace block, a lamp block, an acetylene black, and a channel block, iron oxide, and titanium oxide.

The organic pigments may be azo pigments such as insoluble azo pigments, condensed azo pigments, azo lakes, and chelate azo pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, dye chelate (for example, alkaline dye chelate, and acidic dye chelate), dye lakes (alkaline dye lakes, and acidic dye lakes), nitro pigments, nitroso pigments, aniline black, daylight fluorescent pigments, and the like. One kind of the pigments may be used, and two or more kinds thereof may be used together.

More specifically, the inorganic pigments used for black may be the following carbon block, for example, No. 2300, No. 900, MCF88, No. 33, No. 40, No. 45, No. 52, MA7, MA8, MA100, or No. 2200B manufactured by Mitsubishi Chemical Corporation; Raven 5750, Raven 5250, Raven 5000, Raven 3500, Raven 1255, or Raven 700 manufactured by Colombia Co., Ltd.; Regal 400R, Regal 330R, Regal 660R, Mogul L, Monarch 700, Monarch 800, Monarch 880, Monarch 900, Monarch 1000, Monarch 110, Monarch 1300, or Monarch 1400 manufactured by Cabot Corporation; or Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, or Special Black4 manufactured by Degussa Co., Ltd.

Yellow organic pigments may be C.I. pigment yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213.

Magenta organic pigments may be C.I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, and 264, or C.I. pigment violet 19, 23, 32, 33, 36, 38, 43, and 50.

Cyan organic pigments may be C.I. pigment blue 1, 2, 3, 15, 15:1, 15:2, 15:3, 15:4, 15:6, 15:34, 16, 18, 22, 25, 60, 65, and 66, and C.I. vat blue 4, 60, and the like.

Organic pigment other than magenta, cyan, and yellow may be, for example, C.I. pigment green 7, 10, C.I. pigment brown 3, 5, 25, 26, C.I. pigment orange 2, 5, 7, 13, 14, 15, 16, 24, 34, 36, 38, 40, 43, 63, and the like.

(2) Dyes

Various dyes may be used as the dyes in general ink jet printing such as direct dyes, acidic dyes, edible dyes, alkaline dyes, reactive dyes, dispersion dyes, vat dyes, soluble vat dyes, and reactive dispersion dyes.

The yellow dyes may be C.I. acid yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, 165, C.I. direct yellow 1, 8, 11, 12, 24, 26, 27, 33, 39, 44, 50, 58, 85, 86, 87, 88, 89, 98, 110, 132, 142, 144, C.I. reactive yellow 1, 2, 3, 4, 6, 7, 11, 12, 13, 14, 15, 16, 17, 18, 22, 23, 24, 25, 26, 27, 37, 42, C.I. food yellow 3, 4, C.I. solvent yellow 15, 19, 21, 30, 109, and the like.

The magenta dyes may be C.I. acid red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, 322, C.I. direct red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, 231, C.I reactive red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, 64, C.I. solubilized red 1, C.I. food red 7, 9, 14, and the like.

The cyan dyes may be C.I. acid blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236, 249, C.I. direct blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, 249, C.I. reactive blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, 46, C.I. solubilized vat blue 1, 5, 41, C.I. vat blue 4, 29, 60, C.I. food blue 1, 2, C.I. basic blue 9, 25, 28, 29, 44, and the like.

The dyes other then magenta, cyan, and yellow may be, for example, C.I. acid green 7, 12, 25, 27, 35, 36, 40, 43, 44, 65, 79, C.I. direct green 1, 6, 8, 26, 28, 30, 31, 37, 59, 63, 64, C.I. reactive green 6, 7, C.I. acid violet 15, 43, 66, 78, 106, C.I. direct violet 2, 48, 63, 90, C.I. reactive violet 1, 5, 9, 10, C.I. direct black 154, and the like.

1.2.2. Second Resin

The second ink according to the embodiment contains the second resin. One of the functions of the second resin is to fix the second ink to the printing medium. The content of the second resin is preferably equal to or more than 1 mass % and equal to or less than 10 mass %, and more preferably equal to or more than 2 mass % and equal to or less than 7 mass %, with respect to the whole mass of the second ink. When the content of the second resin is over the range, nozzle clogging or the like may occur to decrease the ejection stability when the second ink is applied to the ink jet printing device. There are many cases where a particle diameter of the color material used in the second ink is smaller than a particle diameter of the white material used in the first ink. For this reason, in the second ink, cohesion of the color material does not easily occur, and unsatisfactory ejection does not easily occur even when the second ink contains a large amount of resin as compared with the first ink. The content of the second resin is a content in term of solid content.

(1) Component (B)

The second resin contains the component (B). The component (B) is resin formed of at least one of polyolefin wax and ethylene vinyl acetate resin. One of the functions of the component (B) is to reduce the occurrence of cracks of the image in addition to the function of improving the fixing property of the second ink described above. The second resin is a concept including one or more kinds of resin, and "the second resin includes . . . ", "the second resin contains . . . ", and "the second resin implies . . . " do not mean that it is included in the structure of resin, but it is resin corresponding to the second resin.

The ink set according to the embodiment may be used to print an image on a printing medium (for example, plastic or metal) which is not limited to white. In such a case, the first ink may be used to form a base layer of a color image, to remove the color of the printing medium or to decrease permeability of a color image. In this case, when the color image is printed on the base layer formed of the first ink, cracks may occur on the image. Although detailed mechanism of occurrence of cracks is not clarified, it is thought that it is caused by rapid contraction of an image occurring in a drying process of ink or cohesion of components included in the first ink and the second ink.

In such a case, when the component (B) is included in the second ink, it is possible to effectively suppress the cracks of the image by the action of the component (B).

The polyolefin wax used as the component (B) is not particularly limited, and for example, may be wax formed of olefin such as ethylene, propylene, and butylene, or derivatives thereof, and copolymer thereof, specifically, polyethylene wax, polypropylene wax, polybutylene wax, and the like. Among them, the polyethylene wax is preferable from the viewpoint of more effective reduction of the occurrence of cracks of the image. One kind or combination of two or more kinds of the polyolefin wax may be used.

A commercially available product of the polyolefin wax may be a Chemipal series such as "Chemipal W4005" (manufactured by Mitsui Chemicals Co., Ltd., polyethylene wax, particle diameter 200 to 800 nm, ring-and-ball method softening point 110° C., penetrability method hardness 3, solid content 40%). In addition, it may be an AQUACER series such as AQUACER 513 (polyethylene wax, particle diameter 100 to 200 nm, melting point 130° C., solid content 30%), AQUACER 507, AQUACER 515, and AQUACER 840 (manufactured by BYK-Chemie Japan Co., Ltd.), a High Tech series such as High Tech E-7025P, High Tech E-2213, High Tech E-9460, High Tech E-9015, High Tech E-4A, High Tech E-5403P, and High Tech E-8237 (manufactured by Toho Chemicals Co., Ltd.), Nopcote PEM-17 (manufactured by Sannopco Co., Ltd., polyethylene emulsion, particle diameter 40 nm), and the like. They are commercially available in an aqueous emulsion type in which polyolefin wax is dispersed in water by an ordinary method.

The second ink according to the embodiment may be directly added in the aqueous emulsion type.

An average particle diameter of polyolefin wax is preferably equal to or more than 10 nm and equal to or less than 800 nm, more preferably equal to or more than 40 nm and equal to or less than 600 nm, and particularly preferably equal to or more than 100 nm and equal to or less than 200 nm. When the average particle diameter of the polyolefin wax falls within the range, it is possible to reduce the occurrence of cracks of the image formed by the first ink and the second ink, and to improve friction resistance. Particularly, when polyolefin wax having the average particle diameter equal or more than 100 nm and equal to or less than 200 nm is used, both performances of the ejection stability of the ink jet printing head and the friction resistance of the image formed by the first ink and the second ink are satisfied at a high standard. Meanwhile, when the average particle diameter of polyolefin wax is less than the range, the effect of improving the friction resistance of the printed image tends to decrease. When the average particle diameter of polyolefin wax is over the range, the ejection stability of ink tends to decrease.

The average particle diameter of polyolefin wax may be measured by a particle size distribution measuring device based on a laser diffraction scattering method as a measurement principle. As the particle size distribution measuring device, for example, a particle size distribution calculator (for example, "Micro-Truck UPA" manufactured by Nikkiso Co., Ltc.) based on a dynamic light scattering method as a measurement principle may be used.

The ethylene vinyl acetate resin is not limited to a copolymer of ethylene and vinyl acetate, and may be a copolymer further including the other monomer. The other monomer is not particularly limited, and known monomers may be used.

The ethylene vinyl acetate resin may be any type of an emulsion type in which it is dispersed in a solvent in a particle formation and a solution type in which it is present in a dissolved state in a solvent, but is preferably the emulsion type in which it is dispersed in the particle formation. The emulsion type may be classified into a compulsory emulsification type and a self emulsification type according to an emulsification method thereof, but any type may be used in the invention.

A commercially available product of the ethylene vinyl acetate may be Eveflex EX45X, EV40WX, EV45LX, EV40LX, V5772ET, V5773W, EV150, EV205W, EV210, EV210ET, EV220, EV220ET, EV250, EV260, EV310, EV360, v577, EV410, EV420, EV450, EV460, EV550, EV560, and P1207 (manufactured by DuPont-Mitsui Polychemicals Co., Ltd.), Sumikaflex 201HQ, 520HQ, and 410HQ (Sumitomo Chemical Co., Ltd.), and the like.

The content of the component B (solid content) is preferably equal to or more than 0.5 mass % and equal to or less than 8 mass %, and more preferably equal to or more than 1 mass % and equal to or less than 6 mass %, with respect to the total mass of the second ink. When the content of the component (B) falls within the range, it is possible to effectively reduce cracks of the image formed using the first ink and the second ink. Meanwhile, when the content of the polyolefin wax is over the range, nozzle clogging or the like of an ink jet printing device may occur, and thus the ejection stability may be decreased. When it is less than the range, there may be a case where it is difficult to expect the effect of reducing the occurrence of cracks of the image formed using the first ink and the second ink.

In the ink set according to the embodiment, a ratio (W2/W1) of the content [W1 (mass %)] of the component (A) in the first ink and the content [W2 (mass %)] of the component (B) in the second ink is preferably equal to or higher than 0.1 and equal to or lower than 2, and more preferably equal to or higher than 0.2 and equal to or lower than 1.5. When the relationship between the component (A) and the component (B) falls within the range, the occurrence of cracks of the image printed using the first ink and the second ink is reduced, and the friction resistance of the image is excellent.

(2) Other Resin

As the second resin, only the component (B) may be used, but the other resin may also be used in addition to the component (B).

One of the functions of the other resin is to improve a dispersion property of the white material in the first ink in addition to further improving the function of fixing the second ink to the printing medium. The other resin may be, for example, known resin such as acryl resin, urethane resin, polyolefin resin, rosin deformed resin, terpene resin, polyester resin, polyamide resin, epoxy resin, vinyl chloride resin, vinyl chloride-vinyl acetate copolymer.

1.2.3. Other Components

The second ink according to the embodiment may contain components other than the components described above. The components usable in the second ink are the same as the components described in "1.1.3. Other Components", and thus the description thereof is not repeated.

1.3. Property of Matter of First Ink and Second Ink

When the ink set according to the embodiment is used in the ink jet printing device, viscosity of the first ink and the second ink (hereinafter, merely referred to as "ink") at 20° C. is preferably equal to or higher than 2 mPa·s and equal to or lower than 10 mPa·s, and more preferably equal to or higher than 3 mPa·s and equal to or lower than 6 mPa·s. When the viscosity of the ink at 20° C. falls within the range, a proper amount of ink is ejected from nozzles to further reduce occurrence of a flying curve or scattering, and thus it can be very appropriately used in the ink jet printing device. The viscosity of the ink may be measured by keeping the temperature of the ink at 20° C. using a vibration type viscometer VM-100AL (manufactured by Yamaichi Electronics Co., Ltd.).

2. Image Printing Method

An image printing method is embodied using the ink set described above, and includes ejecting liquid droplets of the first ink to attach the liquid droplets of the first ink to the printing medium, and ejecting liquid droplets of the second ink to attach the liquid droplets of the second ink onto the liquid droplets of the first ink attached to the printing medium.

The image printing method according to the embodiment may be embodied using the known liquid droplet ejecting device of the related art. The liquid droplets ejecting device may be, for example, an ink jet printer. Hereinafter, the image printing method using the ink jet printer will be described.

First, the liquid droplets of the first ink are ejected from the nozzles of the printing head of the ink jet printer to attach the liquid droplets of the first ink onto the printing medium. The first ink is the white ink containing the white material, and thus the droplets of the first ink attached onto the printing medium represent white.

Accordingly, the first ink serves as a base layer, and it is possible to improve a coloring property of the second ink attached onto the first ink.

Then, the droplets of the second ink are ejected from the nozzles of the printing head to attach the second ink onto the liquid droplets of the first ink attached onto the printing medium. In this case, at least a part of the liquid droplets of the first ink and the liquid droplets of the second ink may come into contact with the printing medium.

The operation described above is repeated, and thus it is possible to form a desired image on the printing medium.

Each of the first ink and the second ink may be provided with the components described above. For this reason, according to the image printing method according to the embodiment, the ejection stability is excellent, there are few cracks of the printed image, and the friction resistance of the printed image is excellent.

Hereinafter, a second embodiment of the invention will be described. In the embodiments to be described below, an example of the invention will be described. The invention is not limited to the following embodiments, and may be various modifications embodied in the scope which does not deviate from the concept of the invention.

1B. Ink Set

An ink set according to an embodiment of the invention includes a white ink (first ink), a color ink (second ink), and a clear ink (third ink). Hereinafter, components included in each ink according to the embodiment will be described in detail.

1B.1. White Ink (First Ink)

The white ink according to the embodiment contains a white material and a first resin. In the invention, the "white ink" that uses brightness (L*) and chromaticity (a* and b*) of ink ejected on EPSON pure photography paper (glossy) (manufactured by Seiko Epson Corp.) by a duty of 100% or higher is in the range of 70≤L*≤100, −4.5≤a*≤2, and −6≤b≤2.5 when measurement is performed in conditions of a light source of D50, a field of view of 2°, a concentration of DIN NB, a white standard of Abs, a filter of No, and a measurement mode of Reflectance, using a spectrum photometer of Spectrolino (product name, manufactured by GretagMacbeth, Co., Ltd.).

In the specification, a "duty value" is a value calculated in the following formula.

$$\text{duty}(\%) = \text{number of actually ejected dots}/(\text{longitudinal resolution} \times \text{transverse resolution}) \times 100$$

(In the formula, the "number of actually ejected dots" is the number of actually ejected dots per unit area, each of the "longitudinal resolution" and the "transverse resolution" is resolution per unit area.)

Next, components included in the white ink will be described in detail.

1B.1.1. White Material

The white material is the same as 1.1.1. described above.

1B.1.2. First Resin

The white ink according to the embodiment contains the first resin. One of the functions of the first resin is to fix the white ink to a printing medium. The content of the first resin (solid content) is preferably equal to or more than 1 mass % and equal to or less than 7 mass %, and more preferably equal to or more than 2 mass % and equal to or less than 4 mass %, with respect to the total mass of the white ink. When the content of the first resin falls within the range, ejection stability of the white ink is satisfactory when the white ink is applied to the ink jet printing device. Meanwhile, the content of the first resin is over the range, the white material may cohere, or nozzle clogging or the like may occur to decrease the ejection stability when the white ink is applied to the ink jet printing device. When the content of the first resin is less than the range, the fixing property of the white ink to the printing medium may be insufficient.

Hereinafter, the components included in the first resin will be described. The first resin is a concept including one or more kinds of resin, and "the first resin includes . . . ", "the first resin contains . . . ", and "the first resin implies . . . " do not mean that it is included in the structure of resin, but it is resin corresponding to the first resin.

(1) Component (A)

The first resin contains the component (A). The component (A) is resin which causes cracks when the component (A) of 0.5 g is dropped onto a slide glass (for example, MICRO SLIDE GLASS S-7213 manufactured by Matsunami Glass Indutries Co., Ltd) and is dried at a temperature of 50° C. and a humidity of 0% RH for 10 minutes.

A specific example of the component (A) may be at least one of fluorene resin and styrene acryl resin. The component (A) has a function of fixing the white ink to the printing medium, and has a function of significantly improving friction resistance of the image formed on the printing medium.

When the component (A) is dried, cracks may occur. The cracks of the component (A) may be determined according to whether or not there are cracks of the dried component (A) when the component (A) of 0.5 g is dropped onto a slide glass (for example, MICRO SLIDE GLASS S-7213 manufactured by Matsunami Glass Indutries Co., Ltd) and is dried at a temperature of 50° C. and a humidity of 0% RH for 10 minutes. The component (A) may be dried using, for example, the known constant temperature and constant humidity bath or the like.

As the fluorene resin used as the component (A), resin having a fluorene structure is not particularly limited, and may be obtained by copolymerizing, for example, the following monomer units (a) to (b).

(a) isophorone diisocyanate (CAS No. 4098-71-9)
(b) 4,4'-(9-fluorenylidene)bis-[2-(phenoxy)ethanol] (CAS No. 117344-32-8)
(c) 3-hydroxy-2-(hydroxymethyl)-2-methylpropionate (CAS No. 4767-03-7)
(d) triethylamine (CAS No. 131-44-8)

As the fluorene resin used as the component (A), resin containing monomer having a fluorene structure represented by 4,4'-(9-fluorenylidene)bis-[2-(phenoxy)ethanol] (CAS No. 117344-32-8) is not particularly limited.

The styrene acryl resin used as the component (A) may be, for example, styrene-acrylate copolymer, styrene-methacrylate copolymer, styrene-methacrylate-acrylate ester copolymer, styrene-α-methylstyrene-acrylate copolymer, and styrene-α-methylstyrene-acrylate-acrylate ester copolymer. A type of copolymer may be any type of a random copolymer, a block copolymer, an alternate copolymer, and a graft copolymer.

The styrene acryl resin may be a commercially available product. A specific example of the commercially available product of styrene acryl resin may be Joncryl 62J (manufactured by BASF Japan, Co., Ltd).

Both of fluorene resin and styrene acryl resin can improve friction resistance of the image formed by the white ink. However, particularly, when the fluorene resin is mixed with the white ink, it is possible to further improve the friction resistance of the image.

The content (solid content) of the component (A) is preferably equal to or more than 1 mass % and equal to or less than 6 mass %, and more preferably equal to or more than 2 mass % and equal to or less than 4 mass % with respect to the whole mass of the white ink. When the content of the component (A) falls within the range, the ejection stability is satisfactory when the white ink is applied to the ink jet printing head, and the friction resistance and fixing property of the printed image are satisfactory. Meanwhile, when the content of the component (A) is over the range, cracks may occur on the printed image, or the ejection stability of the nozzles may be decreased when it is applied to the ink jet printing device. Meanwhile, when the content of the component (A) is less than the range, the friction resistance of the printed image may be decreased.

(2) Other Resin

The first resin may be only the component (A), but may also be the other resin in addition to the component (A).

One of the functions of the other resin is to improve a dispersion property of the white material in the white ink in addition to the function of fixing the white ink to the printing medium. The other resin component may be, for example, the known resin such as acryl resin, urethane resin, polyolefin resin, rosin deformed resin, terpene resin, polyester resin, polyamide resin, epoxy resin, vinyl chloride resin, vinyl chloride-acetate copolymer, and ethylene vinyl acetate resin, or the component (B) to be described later.

When both of the component (A) and the other resin are used as the first resin, the total content of the component (A) and the other resin is preferably equal to or more than 1 mass % and equal to or less than 6 mass %, and more preferably equal to or more than 2 mass % and equal to or less than 4 mass % with respect to the whole mass of the white ink. When the total content of the component (A) and the other resin is over the range, or nozzle clogging or the like may occur so as to decrease the ejection stability when the white ink is applied to the ink jet printing device.

When the white ink contains the component (B) described in "1B.3.1.(1)" described later, the content of the component (B) is preferably equal to or less than 2 mass % ("equal to or less than 2 mass %" includes 0 mass %). The content of the component (B) in the white ink is more preferably equal to or less than 1 mass % (including 0 mass %), even more preferably equal to or less than 0.5 mass % (including 0 mass %), and even much more preferably equal to or less than 0.1 mass % (including 0 mass %). The component (B) having the effect of preventing cracks from occurring is contained in the other ink as much as possible, and the ejection stability of the white ink may be satisfactory.

1B.1.3. Other Components

The other components are the same as "1.1.3." described above.

1B.2. Color Ink (Second Ink)

The color ink according to the embodiment contains color materials other than the white material described above. The ink set according to the embodiment may include a plurality of color ink having colors different from each other. Hereinafter, the components included in the color ink will be described in detail.

1B.2.1. Color Material

The color ink according to the embodiment contains the color materials (hereinafter, merely referred to as "color materials") other than the white material described above. The color materials may be, for example, dyes and pigments. The content of the color materials is preferably equal to or more than 1 mass % and equal to or less than 20 mass %, and more preferably equal to or more than 1 mass % and equal to or less than 15 mass %, with respect to the whole mass of the color ink.

The preferably used color material is the same as "1.2.1 Color Material" described above.

1B.2.2. Resin

The color ink according to the embodiment may contain resin. A function of the resin is, for example, to fix the color ink to the printing medium, and to improve a dispersion property of the color material in the color ink. The content of the resin is preferably equal to or more than 0.1 mass % and equal to or less than 10 mass %, and more preferably equal to or more than 0.5 mass % and equal to or less than 5 mass %, with respect to the whole mass of the color ink. When the content of the resin is over the range, nozzle clogging or the like may occur so as to decrease the ejection stability when the color ink is applied to the ink jet printing device. There are many cases where a particle diameter of the color material used in the color ink is smaller than a particle diameter of the white material used in the white ink. For this reason, in the color ink, cohesion does not easily occur, and unsatisfactory ejection does not easily occur even when the second ink contains a large amount of resin component as compared with the white ink.

Resin usable when the resin is added to the color ink may be, for example, the known resin such as acryl resin, urethane resin, polyolefin resin, rosin deformed resin, terpene resin, polyester resin, polyamide resin, epoxy resin, vinyl chloride resin, and vinyl chloride-acetate copolymer, or the component (B) to be described later.

When the component (B) described in the "1B.3.1.(1)" is contained in the color ink, the content of the component (B) is preferably equal to or less than 2 mass % ("equal to or less than 2 mass %" includes 0 mass %). The content of the component (B) in the color ink is more preferably equal to or less than 1 mass % (including 0 mass %), even more preferably equal to or less than 0.5 mass % (including 0 mass %), and even much more preferably equal to or less than 0.1 mass % (including 0 mass %). The component (B) having the effect of preventing cracks from occurring is contained in the other ink as much as possible, and the ejection stability of the color ink may be satisfactory.

1B.2.3. Other Components

The color ink according to the embodiment may contain the other components. The components usable in the color ink are the same as "1.1.3. Other Components", and the description thereof is not repeated.

1B.3. Clear Ink (Third Ink)

The clear ink according to the embodiment does not substantially contain the color material, and contains the second resin. The clear ink according to the embodiment does not substantially contain the color material, and thus is colorless transparent or colorless semitransparent liquid. In addition, "does not substantially contain the color material" means that, for example, the content of the color material in the ink is less than 0.5 mass %, more preferably less than 0.1 mass %, even more preferably less than 0.01 mass %, and most preferably less than 0.005 mass %. Hereinafter, the components included in the clear ink according to the embodiment will be described.

1B.3.1. Second Resin

The clear ink according to the embodiment contains the second resin. One of functions of the second resin is to fix the clear ink to the printing medium. The content of the second resin is preferably equal to or more than 3 mass % and equal to or less than 10 mass %, and more preferably equal to or more than 3 mass % and equal to or less than 8 mass %, with respect to the whole mass of the clear ink. When the content of the second resin is over the range, nozzle clogging or the like may occur so as to decrease the ejection stability when the clear ink is applied to the ink jet printing device.

(1) Component (B)

The second resin contains the component (B). The component (B) is resin formed of at least one of polyolefin wax and ethylene vinyl acetate resin. One of the functions of the component (B) is to reduce the occurrence of cracks of the image in addition to the function of improving the fixing property of the clear ink described above. The second resin is a concept including one or more kinds of resin, and "the second resin includes . . . ", "the second resin contains . . . ", and "the second resin implies . . . " do not mean that it is included in the structure of resin, but it is resin corresponding to the second resin.

The ink set according to the embodiment may be used to print an image on a printing medium (for example, plastic or metal) which is not white. In such a case, the white ink may be used to form a base layer of a color image, to remove the color of the printing medium or to decrease permeability of a color image. In this case, when the color image is printed on the base layer formed of the white ink, cracks may occur on the image. A detailed mechanism of occurrence of cracks is not clarified, but it is thought that it is caused by rapid contraction of an image occurring in a drying process of ink or cohesion of components included in the white ink and the color ink. In such a case, when the clear ink containing the component (B) is used to form an image, the cracks of the image are effectively reduced and the friction resistance of the image is excellent. When the component (B) is contained in the clear ink to use the white ink and the clear ink together as necessary, the component (B) is not necessarily included in each color ink of a general plurality of prepared color ink, or it is possible to drastically reduce the amount of included component (B).

Meanwhile, when the white ink includes the component (B) or the color ink contains the component (B), it is possible to suppress cracks of the image, but the ejection stability of the ink tends to decrease.

The polyolefin wax used as the component (B) is not particularly limited, and may be for example, wax formed of olefin such as ethylene, propylene, and butylene, or derivatives thereof, and copolymer thereof, specifically, polyethylene wax, polypropylene wax, polybutylene wax, and the like. Among them, the polyethylene wax is preferable from the viewpoint of more effectively reducing the occurrence of cracks of the image. The polyolefin wax may be used by one kind or combination of two or more kinds.

A commercially available product of the polyolefin wax may be Chemipal series such as "Chemipal W4005" (manufactured by Mitsui Chemicals Co., Ltd., polyethylene wax, particle diameter 200 to 800 nm, ring-and-ball method softening point 110° C., penetrability method hardness 3, solid content 40%). In addition, it may be an AQUACER series such as AQUACER 513 (polyethylene wax, particle diameter 100 to 200 nm, melting point 130° C., solid content 30%), AQUACER 507, AQUACER 515, and AQUACER 840 (manufactured by BYK-Chemie Japan Co., Ltd.), a High Tech series such as High Tech E-7025P, High Tech E-2213, High Tech E-9460, High Tech E-9015, High Tech E-4A, High Tech E-5403P, and High Tech E-8237 (manufactured by Toho Chemicals Co., Ltd.), Nopcote PEM-17 (manufactured by Sannopco Co., Ltd., polyethylene emulsion, particle diameter 40 nm), and the like. They are commercially available in an aqueous emulsion type in which polyolefin wax is dispersed in water by an ordinary method.

The clear ink according to the embodiment may be directly added in the aqueous emulsion type.

An average particle diameter of polyolefin wax is preferably equal to or more than 10 nm and equal to or less than 800 nm, more preferably equal to or more than 40 nm and equal to or less than 600 nm, and particularly preferably equal to or more than 100 nm and equal to or less than 200 nm. When the average particle diameter of the polyolefin wax falls within the range, it is possible to reduce the occurrence of cracks of the image caused by overlapping the white ink and the color ink, and to improve friction resistance of the image. Particularly, as the component (B), polyolefin wax having the average particle diameter equal or more than 100 nm and equal to or less than 200 nm is used, both performances of the ejection stability of the ink jet printing head and the friction resistance of the formed image are satisfied at a high standard. Meanwhile, when the average particle diameter of polyolefin wax is less than the range, the effect of improving the friction resistance of the printed image tends to decrease. When the average particle diameter of polyolefin wax is over the range, the ejection stability of ink tends to decrease.

The average particle diameter of polyolefin wax may be measured by a particle size distribution measuring device based on a laser diffraction scattering method as a measurement principle. As the particle size distribution measuring device, for example, a particle size distribution calculator (for example, "Micro-Truck UPA" manufactured by Nikkiso Co., Ltc.) based on a dynamic light scattering method as a measurement principle may be used.

The ethylene vinyl acetate resin is not limited to a copolymer of ethylene and vinyl acetate, and may be a copolymer further including the other monomer. The other monomer is not particularly limited, and known monomers may be used.

The ethylene vinyl acetate resin may be any type of an emulsion type in which it is dispersed in a solvent in a particle formation and a solution type in which it is present in a dissolved state in a solvent, but is preferably the emulsion type in which it is dispersed in the particle formation in the solvent. The emulsion type may be classified into a compulsory emulsification type and a self emulsification type according to an emulsification method thereof, but any type may be used in the invention.

A commercially available product of the ethylene vinyl acetate may be Eveflex EX45X, EV40W•X, EV45LX, EV40LX, V5772ET, V5773W, EV150, EV205W, EV210, EV210ET, EV220, EV220ET, EV250, EV260, EV310, EV360, v577, EV410, EV420, EV450, EV460, EV550, EV560, and P1207 (manufactured by DuPont-Mitsui Polychemicals Co., Ltd.), Sumikaflex 201HQ, 520HQ, and 410HQ (Sumitomo Chemical Co., Ltd.), and the like.

The content of the component B (solid content) is preferably equal to or more than 3 mass % and equal to or less than 10 mass %, and more preferably equal to or more than 3 mass % and equal to or less than 5%, with respect to the total mass of the clear ink. When the content of the component (B) falls within the range, it is possible to effectively reduce cracks of the image formed by overlapping the white ink and the color ink. When the content of the component (B) is over the range, nozzle clogging or the like of an ink jet printing device may occur, and thus the ejection stability may be decreased. When it is less than the range, there is a case where it is difficult to expect the effect of reducing the occurrence of cracks of the image formed by overlapping the white ink and the color ink.

(2) Other Resin Component

The second resin may use the other resin component in addition to the component (B) to further improve the fixing property of the image.

The other resin component may be, for example, a known resin such as acryl resin, urethane resin, polyolefin resin, rosin deformed resin, terpene resin, polyester resin, polyamide resin, epoxy resin, vinyl chloride resin, or a vinyl chloride-vinyl acetate copolymer.

When both of the component (B) and the other resin component are used as the second resin, the total content of the component (B) and the other resin component is preferably equal to or more than 3 mass % and equal to or less than 10 mass %, and more preferably equal to or more than 3 mass % and equal to or less than 5 mass % with respect to the whole mass of the clear ink. When the total content of the component (B) and the other resin component is over the range, or nozzle clogging or the like may occur so as to decrease the ejection stability when the clear ink is applied to the ink jet printing device.

1B.3.2. Other Components

The clear ink according to the embodiment may contain the other components. The components usable in the clear ink are the same as the components described "1.1.3. Other Components", and thus the description thereof is not repeated.

1B.4. Property of Ink Matter

When the ink set according to the embodiment is used in the ink jet printing device, viscosity of the white ink, the color ink, and the clear ink (hereinafter, merely referred to as "ink") at 20° C. is preferably equal to or higher than 2 mPa·s and equal to or lower than 10 mPa·s, and more preferably equal to or higher than 3 mPa·s and equal to or lower than 6 mPa·s. When the viscosity of the ink at 20° C. falls within the range, a proper amount of ink is ejected from nozzles to further reduce occurrence of a flying curve or scattering, and thus it can be appropriately used in the ink jet printing device. The viscosity of the ink may be measured by keeping the temperature of the ink at 20° C. using a vibration type viscometer VM-100AL (manufactured by Yamaichi Electronics Co., Ltd.).

2B. Image Forming Method

The ink set according to the invention may be provided in a liquid droplet ejecting device, and can be used to form an image. The liquid droplet ejecting device may be the known device of the related art, for example, an ink jet printer or the like. Hereinafter, as one kind of the image forming method using the ink set according to the invention, a first image forming method, a second image forming method, and a third image forming method will be described.

2B.1. First Image Forming Method

The first image forming method includes a process (hereinafter, also referred to as "process (1-1)") of ejecting droplets of the white ink and liquid droplets of the clear ink substantially at the same time such that the droplets of the white ink and the droplets of the clear ink are caused to come into contact with and attach onto a printing medium, and a process of ejecting liquid droplets of the color ink so as to attach the liquid droplets onto the liquid droplets of the white ink and the liquid droplets of the clear ink attached to the printing medium (hereinafter, also referred to as "process (1-2)").

In the invention, "ejecting substantially at the same time" means that the liquid droplets of both inks of one ink and the other ink are ejected at the timing when they can be mixed with each other. Accordingly, an image is printed in which the inks are mixed with each other. For example, in a serial printer, there is a case of landing the clear ink and the white ink or the color ink at the same scanning and at the same part.

In the process (1-1), at least a part of both inks of the white ink and the clear ink are mixed with each other. In the contact of the liquid droplets of the white ink and the liquid droplets of the clear ink in the process (1-1), among the liquid droplets, the liquid droplets attached later to the printing medium may come into contact with the liquid droplets attached first to the printing medium, and the liquid droplets may be attached to the printing medium at the same time and come in contact with each other.

In any case, at least a part of both inks are mixed, and an image in which both inks are mixed may be printed.

The process (1-2) is performed after the process (1-1), and the liquid droplets of the color ink is attached onto the liquid droplets of the white ink and the clear ink ejected onto the printing medium. Accordingly, the white ink serves as a base layer, and thus the image formed by the color ink has an excellent coloring property.

The process (1-1) and the process (1-2) described above are repeated, and thus the image using the color ink is formed on the image formed by the white ink and the clear ink.

2B.B. Second Image Forming Method

The second image forming method includes a process (hereinafter, also referred to as "process (2-1)") of ejecting liquid droplets of the white ink to attach the liquid droplets to the printing medium, and a process (hereinafter, also referred to as "process (2-2)") of ejecting droplets of the clear ink and droplets of the color ink substantially at the same time such that the liquid droplets of the clear ink and the droplets of the color ink are caused to come into contact with and attach onto the liquid droplets of the white ink attached to the printing medium.

The liquid droplets of the white ink attached onto the printing medium by the process (2-1) serve as a base layer of the color ink.

In the process (2-2), at least a part of both inks of the clear ink and the color ink are mixed with each other. In the contact of the liquid droplets of the clear ink and the liquid droplets of the color ink in the process (2-2), among the liquid droplets, the liquid droplets attached later to the liquid droplets of the white ink may come into contact with the liquid droplets attached first to the liquid droplets of the white ink, and they may come into contact with the liquid droplets of the white ink at the same time. In any case, at least a part of both inks are mixed, and an image in which both inks are mixed may be printed.

The process (2-1) and the process (2-2) described above are repeated, and thus the image formed of the clear ink and the color ink is formed on the image formed by the white ink.

2B.3. Third Image Forming Method

The third image forming method includes a process (hereinafter, also referred to as "process (3-1)") of ejecting liquid droplets of the white ink to attach the liquid droplets to the printing medium, a process (hereinafter, also referred to as "process (3-2)") of ejecting liquid droplets of the clear ink so as to attach the liquid droplets onto the liquid droplets of the white ink attached to the printing medium, and a process (hereinafter, also referred to as "process (3-3)") of ejecting liquid droplets of the color ink to attach the liquid droplets onto the liquid droplets of the clear ink.

In the third image forming method, it is possible to obtain an image in the order of the white image, the clear image, and the color image laminated on the printing medium. In the third image forming method, since the inks are not ejected substantially at the same time, an image in which the inks are not mixed is formed.

2B.4. Others

Each of the white ink and the clear ink includes the components described above. For this reason, according to the image printing method using the ink set according to the invention, it is possible to form the image with less cracks and excellent friction resistance.

Although the detailed mechanism is not clarified, when the ink set according to the invention is used by the first image forming method and the second image forming method, it is possible to more effectively reduce cracks of the formed image as compared with the case of using the ink set by the third image forming method. When the ink set of the invention is applied to the first image forming method, it is possible to even more effectively reduce cracks of the formed image as compared with the case of applying the ink set to the second image forming method.

When the image is formed on the printing medium using the ink set according to the invention, a ratio ($T_{WB}/T_{WA}$) of the total amount ($T_{WA}$) of the component (A) on the printing medium and the total amount ($T_{WB}$) of the component (B) on the printing medium is preferably equal to or higher than 0.2 and equal to or lower than 2, more preferably equal to or higher than 0.2 and equal to or lower than 1.7, and particularly preferably equal to or higher than 0.3 and equal to or lower than 0.7.

When the ratio ($T_{WB}/T_{WA}$) falls within the range, it is possible to obtain an image with little spread.

The $T_{WA}$ and $T_{WB}$ may be appropriately set, for example, by adjusting duty values of the white ink, the color ink, and the clear ink, the content ratio of the component (A) included in the white ink, and the content ratio of the component (B) included in the clear ink or the like.

A degree of cracking of the image may be changed according to kinds of the color materials added to the color ink. In such a case, the duty value or the like of the clear ink is changed for each kind of color materials added to the color ink, and thus it is possible to print an excellent image with few cracks irrespective of the kind of the color material.

3. Example A

Hereinafter, the invention will be described in detail by examples, but the invention is not limited to the example.

3.1. Preparation of White Ink and Color Ink

With combination amounts shown in Table 1 to Table 3, color material, resin, 1,2-hexanediol, 2-pyrolidone, propylene glycol, polysiloxane surfactant, and ion exchange water were mixed and stirred, the mixture was filtrated by a metal filter of a pore diameter of 5 μm and was subjected to a deairing process using a vacuum pump, and the white ink and the color ink used in the following assessment were prepared.

All units of numerical values shown in Table 1 to Table 3 are mass %, and all values of titanium dioxide particles and resin are value by solid.

As the components shown in Table 1 to Table 3, specifically, the followings were used.

The color materials are titanium dioxide pigments (manufactured by C.I. Kasei Co., Ltd., product name "NanoTek® Slurry", slurry including titanium dioxide particles with an average particle diameter of 300 nm at a ratio of solid concentration of 15%), and cyan pigments (C.I. pigment blue 15:3), the resins are fluorene resin, styrene acryl resin (manufactured by BASF Japan Co., Ltd., product name "Joncryl 62J", polyethylene wax A (manufactured by BYK-Chemie Japan Co., Ltd., product name "AQUACER 513", average particle diameter 150 nm), polyethylene wax B (manufactured by Mitsui Chemicals Co., Ltd., product name "Chemipal W4005", average particle diameter 600 nm), polyethylene wax C (manufactured by Sannopco Co., Ltd., product name "Nopcote PEM-17", average particle diameter 40 nm), ethylene vinyl acetate resin (manufactured by DuPont-Mitsui Polychemicals Co., Ltd., "EVeflex EV210", average particle diameter 200 nm), urethane resin (manufactured by Mitsui Chemicals Co., Ltd., product name "W635", average particle diameter 150 nm), and the other components are a surfactant (manufactured by BASF Japan Co., Ltd., product name "BYK-348", silicon surfactant), 1,2-hexanediol, 2-pyrolidone, propylene glycol, and ion exchange water.

The fluorene resin was obtained by the following combination. The fluorene resin was combined by weighting and sufficiently mixing 30 parts by mass of isophorone diisocyanate, 50 parts by mass of 4,4'-(9-fluorenylidene)bis[2-(phenoxy)ethanol], 100 parts by mass of 3-hydroxy-2-(hydroxymethyl)-2-methylpropionate, and 30 parts by mass of triethylamine, and then stirring the mixture under existence of a catalyst at 120° C. for 5 hours. The obtained fluorene resin was resin of molecular weight of 3300 containing 4,4'-(9-fluorenylidene)bis[2-(phenoxy)ethanol] at a monomer configuration ratio of about 50 mass %.

Both of the used styrene acryl resin and the fluorene resin are resins which cause cracks when resin of 0.5 g is dropped onto a slide glass (for example, MICRO SLIDE GLASS S-7213 manufactured by Matsunami Glass Indutries Co., Ltd) and is dried at a temperature of 50° C. and a humidity of 0% RH for 10 minutes.

As the cyan pigments, pigment dispersion liquid dispersed by the following method was used.

First, in a separable flask of 2000 ml provided with a stirring device, a reflux tube, a temperature sensor, and a dropping funnel, nitrogen substitution was sufficiently performed, then 200.0 parts by mass of diethylene glycol monomethyl ether was put in the separable flask, and a temperature was raised to 80° C. while stirring it. Then, 200.0 parts by mass of diethylene glycol monomethyl ether, 483.0 parts by mass of cyclohexyl acrylate (hereinafter, referred to as "CHA"), 66.6 parts by mass methacrylate (hereinafter, referred to as "MAA"), 50.4 parts by mass of acrylate (hereinafter, referred to as "AA"), and 4.8 parts by mass of t-butylperoxy(2-ethylhexanoate) (hereinafter, referred to as "BPEH") were put in the dropping funnel, and it was dropped into the separable flask at 80° C. for 4 hours. After completion of the dropping, it was kept at 80° C. at 1 hour, then 0.8 parts by mass of BPEH was added thereto, and reaction was performed at 80° C. at 1 hour. After completion of ripening, diethylene glycol monomethyl ether was removed by distillation under reduced pressure. Thereafter, 600.0 parts by mass of methyl ethyl ketone (hereinafter, referred to as "MEK") was added thereto, and an ink jet ink polymer composition of resin solid of 50% was obtained.

A part of the ink jet ink polymer composition solution obtained as described above was taken and dried for 1 hour by an ignition drier of 105° C. Then, an acid value of the solid of the obtained ink jet ink polymer composition was 130 mgKOH/g, and the mass average molecular weight was 34000.

Then, 6.0 parts by mass of a 30% sodium hydroxide aqueous solution was added to 120.0 parts by mass of the ink jet ink polymer composition solution, the mixture was stirred for 5 minutes by a high speed Disper, 480.0 parts by mass of the dispersion liquid including C.I. pigment blue 15:3 with pigment concentration of 25 mass % was further added thereto, the mixture was stirred for 1 hour by the high speed Disper, and a pigment dispersion liquid was obtained.

3.2. Ink Jet Printer

In the following assessment test, as a printer of ink jet printing type, a remodeled ink jet printer PX-G930 (product name, manufactured by Seiko Epson Corp., nozzle resolution: 180 dpi) which provides a paper guide unit with a temperature variable heater was used.

Each of the white ink and the color ink described in Table 1 to Table 3 was filled into an ink cartridge only for the ink jet printer (manufactured by Seiko Epson Corp., product name "PX-G930"), and ink sets formed of the white ink and the color ink were obtained for each of examples and comparative examples. The ink set obtained as described above was mounted on the remodeled printer.

3.3. Continuous Printing of Solid Pattern Image (1) Assessment Test of Ejection Stability Liquid droplets were ejected from nozzles for each ink using the printer in the conditions of resolution of 1440×720 dpi and duty of 100%, printing of monochromatic solid pattern images was performed on 10 sheets of printing mediums with A4 size (Lumirror® S10-100 µm, manufactured by Toray Co., Ltd.).

(2) Assessment of Ejection Stability

After continuously printing the solid pattern image, a nozzle check pattern was printed for each ink.

In this case, omission or flying curve were observed to assess the ejection stability of each ink. The assessment standard is as follows, and the assessment of C or higher may be determined as the ejection stability with no problem in practical use. The assessment of the ejection stability is assessment of the ejection stability of the white ink.

A: no omission of nozzles, and no flying curve
B: no omission of nozzles, but flying curve
C: omission of nozzles is recognized less than 10 nozzles
D: omission of nozzles is recognized equal to or more than 10 nozzles 3.4. Friction Resistance Assessment Test (1) Production of Samples for Friction Resistance Assessment Printing and drying of the solid pattern image were performed on the printing medium with A4 size (Lumirror® S10-100 µm, manufactured by Toray Co., Ltd.) using the printer.

Specifically, first, only the white ink was attached onto the printing medium in the conditions of resolution of 1440×720 dpi and duty of 100%, to form a white solid pattern image. Then, only the color ink was attached onto the white solid pattern image in the conditions of resolution of 1440×720 dpi and duty of 100%, to form a cyan solid pattern image. The obtained image was dried by a heater provided in the printer. In such a manner, a sample for friction resistance assessment in which the cyan solid pattern image was printed on the white solid pattern image was obtained.

A temperature of the heater of the printer was set to 45° C. During the printing of the image, a surface temperature of the printing medium in the vicinity of the head of the printer was measured, and the surface temperature of the printing medium was substantially the same as the heater set temperature of the printer.

(2) Friction Resistance Assessment

The obtained friction resistance assessment sample was dried in a constant temperature chamber of 50° C. for 10 minutes, then a friction material with white cotton for friction (Kanakin No. 3) and a print matter were adjusted in the conditions of load of 200 g and 10 times of friction using a color fastness rubbing tester AB-301 (Tester Industries Co., Ltd.), and the surface state of the image was visually observed. The assessment standard is as follows, the assessment of C or higher may be determined as the friction resistance with no problem in practical use.

A: no peeling, and little transfer of color to white cotton for friction
B: no peeling, but much transfer of color to white cotton for friction
C: partial peeling of image (less than 10% of printed area of image)
D: peeling of image (equal to or more than 10% of printed area of image)

3.5. Crack Test
(1) Production of Sample for Crack Assessment

Printing and drying of the solid pattern image were performed on the printing medium with A4 size (Lumirror® S10-100 μm, manufactured by Toray Co., Ltd.) using the printer.

Specifically, first, only the white ink was attached onto the printing medium in the conditions of resolution of 1440×720 dpi and duty of 100%, to form a white solid pattern image. Then, only the color ink was attached onto the white solid pattern image in the conditions of resolution of 1440×720 dpi and duty of 30% to 100%, to form a color image (cyan image). The obtained image was dried by a heater provided in the printer. In such a manner, a sample for friction resistance assessment in which the cyan image for each duty was printed on the white solid pattern image was obtained.

A temperature of the heater of the remodeled printer was set to 45° C. During the printing of the image, a surface temperature of the printing medium in the vicinity of the head of the remodeled printer was measured, and the surface temperature of the printing medium was substantially the same as the heater set temperature of the remodeled printer.

(2) Crack Assessment

The obtained sample for crack assessment was dried in a constant temperature chamber of 50° C. for 10 minutes, and then the image surface was visually determined. The assessment standard is as follows, the assessment of C or higher may be determined as prevention of cracks with no problem in practical use.

A: no crack of image even at duty of 100%
B: no crack of image at duty to 80%
C: no crack of image at duty to 50%
D: cracks of image even at duty of 30%

3.6. Assessment Result

The assessment results are shown in Table 1 to Table 3. In Tables, W1 indicates the total content ratio (mass %) of the fluorene resin and the styrene acryl resin in the white ink. W2 indicates the total content ratio (mass %) of polyethylene waxes A to C and the ethylene vinyl acetate resin in the color ink.

TABLE 1

|  |  | Ex. 1 | | Ex. 2 | | Ex. 3 | | Ex. 4 | | Ex. 5 | | Ex. 6 | |
| --- | --- | --- | --- | --- | --- | --- | --- | --- | --- | --- | --- | --- | --- |
|  |  | White Ink | Color Ink | White Ink | Color Ink | White Ink | Color Ink | White Ink | Color Ink | White Ink | Color Ink | White Ink | Color Ink |
| Color Material | Titanium Dioxide Pigment | 10 |  | 10 |  | 10 |  | 10 |  | 10 |  | 10 |  |
|  | Cyan Pigment |  | 4 |  | 4 |  | 4 |  | 4 |  | 4 |  | 4 |
| Resin Component | Fluorene Resin | 4 |  | 4 |  |  |  | 4 |  | 4 |  | 4 |  |
|  | Styrene Acryl Resin |  |  |  |  | 4 |  |  |  |  |  |  |  |
|  | Polyethylene Wax A |  | 1 |  | 2 |  | 2 |  |  |  |  |  |  |
|  | Polyethylene Wax B |  |  |  |  |  |  |  | 2 |  |  |  |  |
|  | Polyethylene Wax C |  |  |  |  |  |  |  |  |  | 2 |  |  |
|  | Ethylene Vinyl Acetate Resin |  |  |  |  |  |  |  |  |  |  |  | 2 |
|  | Urethane Resin |  | 1 |  | 1 |  | 1 |  | 1 |  | 1 |  | 1 |
| Other Component | 1,2,hexanediol | 5 | 5 | 5 | 5 | 5 | 5 | 5 | 5 | 5 | 5 | 5 | 5 |
|  | 2-pyrolidone | 2 | 2 | 2 | 2 | 2 | 2 | 2 | 2 | 2 | 2 | 2 | 2 |
|  | Surfactant | 1 | 1 | 1 | 1 | 1 | 1 | 1 | 1 | 1 | 1 | 1 | 1 |
|  | Propylene Glycol | 8 | 10 | 8 | 10 | 8 | 10 | 8 | 10 | 8 | 10 | 8 | 10 |
|  | Ion Exchange Water | Residual | Residual | Residual | Residual | Residual | Residual | Residual | Residual | Residual | Residual | Residual | Residual |
| Total (mass %) |  | 100 | 100 | 100 | 100 | 100 | 100 | 100 | 100 | 100 | 100 | 100 | 100 |
| Assessment Test Result | Ejection Stability | B | | B | | B | | B | | B | | B | |
|  | Friction Resistance | B | | A | | B | | A | | B | | A | |
|  | Crack | B | | A | | A | | A | | A | | B | |
| Content Ratio | (W2/W1) | 0.25 | | 0.5 | | 0.5 | | 0.5 | | 0.5 | | 0.5 | |

TABLE 2

| | | Ex. 7 | | Ex. 8 | | Ex. 9 | | Ex. 10 | | Ex. 11 | | Ex. 12 | |
|---|---|---|---|---|---|---|---|---|---|---|---|---|---|
| | | White Ink | Color Ink | White Ink | Color Ink | White Ink | Color Ink | White Ink | Color Ink | White Ink | Color Ink | White Ink | Color Ink |
| Color Material | Titanium Dioxide Pigment | 10 | | 10 | | 10 | | 10 | | 10 | | 10 | |
| | Cyan Pigment | | 4 | | 4 | | 4 | | 4 | | 4 | | 4 |
| Resin Component | Fluorene Resin | 4 | | 4 | 1 | 4 | 1 | 2 | | 2 | | 4 | |
| | Styrene Acryl Resin | | | | | | | | | 2 | | | |
| | Polyethylene Wax A | | 6 | | 8 | | 0.5 | | 2 | | 2 | | 1 |
| | Polyethylene Wax B | | | | | | | | | | | | |
| | Polyethylene Wax C | | | | | | | | | | | | |
| | Ethylene Vinyl Acetate Resin | | | | | | | | | | | | 1 |
| | Urethane Resin | | 1 | | 1 | | 1 | | 1 | | 1 | | 1 |
| Other Component | 1,2,hexanediol | 5 | 5 | 5 | 5 | 5 | 5 | 5 | 5 | 5 | 5 | 5 | 5 |
| | 2-pyrolidone | 2 | 2 | 2 | 2 | 2 | 2 | 2 | 2 | 2 | 2 | 2 | 2 |
| | Surfactant | 1 | 1 | 1 | 1 | 1 | 1 | 1 | 1 | 1 | 1 | 1 | 1 |
| | Propylene Glycol | 8 | 10 | 8 | 10 | 8 | 10 | 8 | 10 | 8 | 10 | 8 | 10 |
| | Ion Exchange Water | Residual | Residual | Residual | Residual | Residual | Residual | Residual | Residual | Residual | Residual | Residual | Residual |
| Total (mass %) | | 100 | 100 | 100 | 100 | 100 | 100 | 100 | 100 | 100 | 100 | 100 | 100 |
| Assessment Test Result | Ejection Stability | B | | C | | B | | B | | B | | B | |
| | Friction Resistance | A | | A | | A | | C | | B | | A | |
| | Crack | A | | A | | C | | A | | A | | B | |
| Content Ratio | (W2/W1) | 1.5 | | 2 | | 0.125 | | 1 | | 0.5 | | 0.5 | |

TABLE 3

| | | Comp. 1 | | Comp. 2 | |
|---|---|---|---|---|---|
| | | White Ink | Color Ink | White Ink | Color Ink |
| Color Material | Titanium Dioxide Pigment | 10 | | 10 | |
| | Cyan Pigment | | 4 | | 4 |
| Resin Component | Fluorene Resin | 4 | | | |
| | Styrene Acryl Resin | | | | |
| | Polyethylene Wax A | | | | 2 |
| | Polyethylene Wax B | | | | |
| | Polyethylene Wax C | | | | |
| | Ethylene Vinyl Acetate | | | | |
| | Urethane Resin | | 1 | 4 | 1 |
| Other Component | 1,2,hexanediol | 5 | 5 | 5 | 5 |
| | 2-pyrolidone | 2 | 2 | 2 | 2 |
| | Surfactant | 1 | 1 | 1 | 1 |
| | Propylene Glycol | 8 | 10 | 8 | 10 |
| | Ion Exchange Water | Residual | Residual | Residual | Residual |
| Total (mass %) | | 100 | 100 | 100 | 100 |
| Assessment Test Result | Ejection Stability | B | | B | |
| | Friction Resistance | C | | D | |
| | Crack | D | | A | |
| Content Ratio | (W2/W1) | 0 | | 0 | |

As shown in the assessment test results of Table 1 and Table 2, according to the ink sets of Example 1 to Example 12, the cracks were reduced, the images with excellent friction resistance were printed, and the ejection stability was satisfactory.

Meanwhile, in the ink set of Comparative Example 1, the color ink does not contain both of polyethylene wax and ethylene vinyl acetate resin. For this reason, as shown in the assessment test result of Table 3, cracks of image occurred in the condition of a low duty.

In the ink set of Comparative Example 2, the white ink does not contain both of fluorene resin and styrene acryl resin. For this reason, as shown in the assessment test result of Table 3, the image with no excellent friction resistance was printed.

4. Example B

Hereinafter, the invention will be described in detail with reference to Examples, but the invention is not limited thereto.

4.1. Preparation of Ink

With combination amounts shown in Table 1 to Table 3, color material, resin, 1,2-hexanediol, 2-pyrolidone, propylene glycol, polysiloxane surfactant, and ion exchange water were mixed and stirred, the mixture was filtrated by a meta filter of a pore diameter of 5 μm and was subjected to a deairing process using a vacuum pump, and the white ink, the clear ink, and the color ink used in the following assessment were prepared.

All units of numerical values shown in Table 4 to Table 7 are mass %, and all values of titanium dioxide particles and resin are value by solid.

As the components shown in Table 4 to Table 7, specifically, the followings were used.

The color materials are titanium dioxide pigments (manufactured by C.I. Kasei Co., Ltd., product name "NanoTek® Slurry", slurry including titanium dioxide particles with an average particle diameter of 300 nm at a ratio of solid concentration of 15%), and cyan pigments (C.I. pigment blue 15:3), the resin components are fluorene resin, styrene acryl resin (manufactured by BASF Japan Co., Ltd., product name "Joncryl 62J", polyethylene wax A (manufactured by BYK-Chemie Japan Co., Ltd., product name "AQUACER 513", average particle diameter 150 nm), polyethylene wax B (manufactured by Mitsui Chemicals Co., Ltd., product name "Chemipal W4005", average particle diameter 600 nm), polyethylene wax C (manufactured by Sannopco Co., Ltd., product name "Nopcote PEM-17", average particle diameter 40 nm), ethylene vinyl acetate resin (manufactured by DuPont-Mitsui Polychemicals Co., Ltd., "EVeflex EV210", average particle diameter 200 nm), urethane resin (manufactured by Mitsui Chemicals Co., Ltd., product name "W635", average particle diameter 150 nm), and the other components are a surfactant (manufactured by BASF Japan Co., Ltd., product name "BYK-348", silicon surfactant), 1,2-hexanediol, 2-pyrolidone, propylene glycol, and ion exchange water.

The fluorene resin was obtained by the following combination. The fluorene resin was combined by weighting and sufficiently mixing 30 parts by mass of isophorone diisocyanate, 50 parts by mass of 4,4'-(9-fluorenylidene)bis[2-(phenoxy)ethanol], 100 parts by mass of 3-hydroxy-2-(hydroxymethyl)-2-methylpropionate, and 30 parts by mass of triethylamine, and then stirring the mixture under existence of a catalyst at 120° C. for 5 hours. The obtained fluorene resin was resin of molecular weight of 3300 containing 4,4'-(9-fluorenylidene)bis[2-(phenoxy)ethanol] at a monomer configuration ratio of about 50 mass %.

Both of the used styrene acryl resin and the fluorene resin are resins which cause cracks when resin of 0.5 g is dropped onto a slide glass (for example, MICRO SLIDE GLASS S-7213 manufactured by Matsunami Glass Indutries Co., Ltd) and is dried at a temperature of 50° C. and a humidity of 0% RH for 10 minutes.

The content of propylene glycol in Examples and Comparative Examples was changed to adjust viscosity of each ink.

4.2. Ink Jet Printer

In the following assessment test, as a printer of ink jet printing type, a remodeled ink jet printer PX-G930 (product name, manufactured by Seiko Epson Corp., nozzle resolution: 188 dpi) which provides a paper guide unit with a temperature variable heater was used.

Each of the white ink, the clear ink, and the color ink described in Table 4 to Table 7 was filled into an ink cartridge only for the ink jet printer (manufactured by Seiko Epson Corp., product name "PX-G930"), and ink sets formed of the white ink, the clear ink, and the color ink were obtained for each of examples and comparative examples. The ink set obtained as described above was mounted on the remodeled printer.

4.3. Continuous Printing of Solid Pattern Image (1) Assessment Test of Ejection Stability Liquid droplets were ejected from nozzles for each ink using the printer in the conditions of resolution of 1440×720 dpi and duty of 100%, printing of monochromatic solid pattern images was performed on 10 sheets of printing mediums with A4 size (Lumirror® S10-100 μm, manufactured by Toray Co., Ltd.).

(2) Assessment of Ejection Stability

After continuously printing the solid pattern image, a nozzle check pattern was printed for each ink.

In this case, omission or flying curve were observed to assess the ejection stability of each ink, and the ink with the worst ejection stability is an assessment target. The assessment standard is as follows, and the assessment of B or higher may be determined as the ejection stability with no problem in practical use.

A: no omission of nozzles, and no flying curve
B: no omission of nozzles, but flying curve
C: omission of nozzles is recognized 4.4. Friction Resistance Assessment Test 4.4.1. Production of Samples for Friction Resistance Assessment (1) Examples 1B to Example 10B Printing and drying of the solid pattern image were performed on the printing medium with A4 size (Lumirror® S10-100 μm, manufactured by Toray Co., Ltd.) using the printer.

Specifically, first, the white ink (printing conditions: resolution of 1440×720 dpi and duty of 100%) and the clear ink (printing conditions: resolution of 1440×720 dpi and duty of 20% to 60%) were ejected substantially at the same time, the liquid droplets of both inks come in contact (mix) with each other to be attached onto the printing medium, and the clear image and white solid pattern image were formed.

Only the color ink was attached onto the white ink and clear ink attached to the printing medium (printing condition: resolution of 1440×720 dpi and duty of 100%), to form a cyan solid pattern image. Thereafter, the obtained image was dried by a heater provided in the printer. In such a manner, samples (Example 1B to Example 10B) for friction resistance assessment in which the cyan solid pattern image was printed on the white solid pattern image and the clear image were obtained.

A temperature of the heater of the printer was set to 45° C. During the printing of the image, a surface temperature of the printing medium in the vicinity of the head of the printer was measured, and the surface temperature of the printing medium was substantially the same as the heater set temperature of the printer.

(2) Example 11B

Printing and drying of the solid pattern image were performed on the printing medium with A4 size (Lumirror® S10-100 μm, manufactured by Toray Co., Ltd.) using the printer.

Specifically, first, only the white ink (printing condition: resolution of 1440×720 dpi and duty of 100%) was attached onto the printing medium, and the white solid pattern image was formed.

Then, the clear ink (printing conditions: resolution of 1440×720 dpi and duty of 20%) and the color ink (printing conditions: resolution of 1440×720 dpi and duty of 100%) are ejected substantially at the same time on the white solid pattern image, the liquid droplets of both inks come in contact and are mixed with each other on the printing medium, and the clear ink image and the cyan solid pattern image were formed. Thereafter, the obtained image was dried by a heater provided in the printer. In such a manner, a sample (Example 11B) for friction resistance assessment in which the clear image and the cyan solid pattern image were printed on the white solid pattern image was obtained.

A temperature of the heater of the printer was set to 45° C. During the printing of the image, a surface temperature of the printing medium in the vicinity of the head of the printer was measured, and the surface temperature of the printing medium was substantially the same as the heater set temperature of the printer.

(3) Comparative Example 1B and Example 2B

Printing and drying of the solid pattern image were performed on the printing medium with A4 size (Lumirror® S10-100 μm, manufactured by Toray Co., Ltd.) using the printer.

Specifically, first, only the white ink (printing condition: resolution of 1440×720 dpi and duty of 100%) was attached onto the printing medium, and the white solid pattern image was formed. Then, only the color ink (printing condition: resolution of 1440×720 dpi and duty of 100%) was attached onto the printing medium, and the cyan solid pattern image was formed on the white solid pattern image.

The obtained image was dried by a heater provided in the printer. In such a manner, samples (Comparative Example 1B and Comparative Example 2B) for friction resistance assessment in which the cyan solid pattern image was printed on the white solid pattern image were obtained.

A temperature of the heater of the printer was set to 45° C. During the printing of the image, a surface temperature of the printing medium in the vicinity of the head of the printer was measured, and the surface temperature of the printing medium was substantially the same as the heater set temperature of the printer.

4.4.2. Friction Assessment

The obtained friction resistance assessment sample was dried in a constant temperature chamber of 50° C. for 10 minutes, then a friction material with white cotton for friction (Kanakin No. 3) and a print matter were adjusted in the conditions of load of 200 g and 10 times of friction using a color fastness rubbing tester AB-301 (Tester Industries Co., Ltd.), and the surface state of the image was visually observed. The assessment standard is as follows, the assessment of B or higher may be determined as the friction resistance with no problem in practical use.

A: transfer of color to white cotton for friction, but no peeling of basic white image B: peeling is recognized on basic white image [0%<(area of peeled white image]≤50%)

C: significant peeling is recognized on basic white image [50%<(area of peeled white image]≤100%)

4.5. Crack Test 4.5.1. Production of Sample for Crack Assessment (1) Example 1B to Example 10B The samples for crack assessment in Example 1B to Example 10B were produced in the same manner as "4.4.1.(1)" except that the duty of color ink for each Example was 15% to 100%.

(2) Example 11B

The sample for crack assessment in Example 11B was produced in the same manner as "4.4.1.(2)" except that the duty of color ink for each Example was 15% to 100%.

(3) Comparative Example 1B to Comparative Example 2B

The samples for crack assessment in Comparative Example 1 and Comparative Example 2 were produced in the same manner as "4.4.1.(3)" except that the duty of color ink for each Comparative Example was 15% to 100%.

4.5.2. Crack Assessment

The obtained sample for crack assessment was dried in a constant temperature chamber of 50° C. for 10 minutes, and then the image surface was visually determined. The assessment standard is as follows, the assessment of B or higher may be determined as prevention of cracks with no problem in practical use.

A: no crack of image even at duty of 100% of color ink

B: no crack of image at duty to 80% of color ink

C: no crack of image at duty to 50% of color ink

D: cracks of image even at duty of 30% of color ink 4.6. Spread Test 4.6.1. Production of Sample for Spread Assessment (1) Example 1B to Example 10B The samples for spread assessment in Example 1B to Example 10B were produced in the same manner as "4.4.1.(1)" described above, except that the duty of the color ink for each Example was 15% to 100% and the printing was performed to see a boundary portion between the white image and the color ink image.

(2) Example 11B

The sample for spread assessment in Example 11B was produced in the same manner as "4.4.1.(2)" described above, except that the duty of the color ink was 15% to 100% and the color ink was ejected to see a boundary portion between the white image and the color image.

(3) Comparative Example 1B and Comparative Example 2B

The samples for spread assessment in Comparative Example 1B and Comparative Example 2B were produced in the same manner as "4.4.1.(3)" described above, except that the duty of the color ink for each Comparative Example was 15% to 100% and the color ink was ejected to see a boundary portion between the white image and the color image.

4.6.2. Spread Assessment

The obtained samples for spread assessment was dried in a constant temperature chamber of 50° C. for 10 minutes, and then the spread of the boundary potion between the white image and the color image was visually observed. The assessment standard is as follows, the assessment of C or higher may be determined as prevention of spread with no problem in practical use.

A: spread is not recognized even at duty of 100% of color ink

B: spread is not recognized at duty to 80% of color ink

C: spread is not recognized at duty to 50% of color ink

D: spread is recognized even at duty of 30% of color ink 4.7. Assessment Result

The assessment results are shown in Table 4 to Table 7. In Table 4 to Table 7, $T_{WA}$ indicates the total content of the component (A) on the printing medium, and $T_{WB}$ indicates the total content of the component (B) on the printing medium.

TABLE 4

|  | Ex. 1B | | | Ex. 2B | | | Ex. 3B | | | Ex. 4B | | |
| --- | --- | --- | --- | --- | --- | --- | --- | --- | --- | --- | --- | --- |
| Printing Method | White Ink + Clear Ink→Color Ink (First Image Forming Method) | | | White Ink + Clear Ink→Color Ink (First Image Forming Method) | | | White Ink + Clear Ink→Color Ink (First Image Forming Method) | | | White Ink + Clear Ink→Color Ink (First Image Forming Method) | | |
| Ink Set | White Ink (duty 100%) | Color Ink | Clear Ink (duty 20%) | White Ink (duty 100%) | Color Ink | Clear Ink (duty 20%) | White Ink (duty 100%) | Color Ink | Clear Ink (duty 20%) | White Ink (duty 100%) | Color Ink | Clear Ink (duty 20%) |

TABLE 4-continued

|  |  | Ex. 1B | | | Ex. 2B | | | Ex. 3B | | | Ex. 4B | | |
|---|---|---|---|---|---|---|---|---|---|---|---|---|---|
| Color Material | Titanium Dioxide Pigment | 10 | | | 10 | | | 10 | | | 10 | | |
|  | Cyan Pigment | | 4 | | | 4 | | | 4 | | | 4 | |
| Resin Component | Fluorene Resin (Component A) | 3 | | | 3 | | | 3 | | | 3 | | |
|  | Styrene Acryl Resin (component A) | | | | | | | | | | | | |
|  | Polyethylene Wax A (Component B) | | | 3 | | | 5 | | | 8 | | | 10 |
|  | Polyethylene Wax B (Component B) | | | | | | | | | | | | |
|  | Polyethylene Wax C (Component B) | | | | | | | | | | | | |
|  | Ethylene Vinyl Acetate (Component B) | | | | | | | | | | | | |
|  | Urethane Resin | | 1 | 1 | | 1 | | | 1 | | | 1 | 1 |
| Other Component | 1,2hexanediol | 5 | 5 | 5 | 5 | 5 | 5 | 5 | 5 | 5 | 5 | 5 | 5 |
|  | 2-pyrolidone | 2 | 2 | 2 | 2 | 2 | 2 | 2 | 2 | 2 | 2 | 2 | 2 |
|  | Surfactant | 1 | 1 | 1 | 1 | 1 | 1 | 1 | 1 | 1 | 1 | 1 | 1 |
|  | Propylene Glycol | 8 | 10 | 14 | 8 | 10 | 12 | 8 | 10 | 12 | 8 | 10 | 7 |
|  | Ion Exchange Water | Residual | Residual | Residual | Residual | Residual | Residual | Residual | Residual | Residual | Residual | Residual | Residual |
| Total (mass %) |  | 100 | 100 | 100 | 100 | 100 | 100 | 100 | 100 | 100 | 100 | 100 | 100 |
| Raito | $T_{WB}/T_{WA}$ | 0.2 | | | 0.33 | | | 0.53 | | | 0.67 | | |
| Assessment Result | Ejection Stability | A | | | A | | | A | | | B | | |
|  | Friction Resistance | B | | | B | | | A | | | A | | |
|  | Crack | B | | | A | | | A | | | A | | |
|  | Spread | B | | | A | | | A | | | A | | |

TABLE 5

|  |  | Ex. 5B | | | Ex. 6B | | | Ex. 7B | | |
|---|---|---|---|---|---|---|---|---|---|---|
| Printing Method |  | White Ink + Clear Ink→Color Ink (First Image Forming Method) | | | White Ink + Clear Ink→Color Ink (First Image Forming Method) | | | White Ink + Clear Ink→Color Ink (First Image Forming Method) | | |
| Ink Set |  | White Ink (duty 100%) | Color Ink | Clear Ink (duty 50%) | White Ink (duty 100%) | Color Ink | Clear Ink (duty 60%) | White Ink (duty 100%) | Color Ink | Clear Ink (duty 20%) |
| Color Material | Titanium Dioxide Pigment | 10 | | | 10 | | | 10 | | |
|  | Cyan Pigment | | 4 | | | 4 | | | 4 | |
| Resin Component | Fluorene Resin (Component A) | 3 | | | 3 | | | | | |
|  | Styrene Acryl Resin (component A) | | | | | | | | 3 | |
|  | Polyethylene Wax A (Component B) | | | 10 | | | 10 | | | 8 |
|  | Polyethylene Wax B (Component B) | | | | | | | | | |
|  | Polyethylene Wax C (Component B) | | | | | | | | | |
|  | Ethylene Vinyl Acetate (Component B) | | | | | | | | | |
|  | Urethane Resin | | 1 | | | 1 | | | 1 | |

TABLE 5-continued

| | | Ex. 5B | | | Ex. 6B | | | Ex. 7B | | |
|---|---|---|---|---|---|---|---|---|---|---|
| Other Component | 1,2,hexanediol | 5 | 5 | 5 | 5 | 5 | 5 | 5 | 5 | 5 |
| | 2-pyrolidone | 2 | 2 | 2 | 2 | 2 | 2 | 2 | 2 | 2 |
| | Surfactant | 1 | 1 | 1 | 1 | 1 | 1 | 1 | 1 | 1 |
| | Propylene Glycol | 8 | 10 | 7 | 8 | 10 | 7 | 8 | 10 | 12 |
| | Ion Exchange Water | Residual | Residual | Residual | Residual | Residual | Residual | Residual | Residual | Residual |
| Total (mass %) | | 100 | 100 | 100 | 100 | 100 | 100 | 100 | 100 | 100 |
| Raito | $T_{WB}/T_{WA}$ | | 1.67 | | | 2 | | | 0.53 | |
| Assessment Result | Ejection Stability | | B | | | B | | | A | |
| | Friction Resistance | | A | | | A | | | B | |
| | Crack | | A | | | A | | | B | |
| | Spread | | B | | | C | | | A | |

TABLE 6

| | | Ex. 8B | | | Ex. 9B | | | Ex. 10B | | | Ex. 11B | | |
|---|---|---|---|---|---|---|---|---|---|---|---|---|---|
| Printing Method | | White Ink + Clear Ink→Color Ink (First Image Forming Method) | | | White Ink + Clear Ink→Color Ink (First Image Forming Method) | | | White Ink + Clear Ink→Color Ink (First Image Forming Method) | | | White Ink + Clear Ink→Color Ink (Second Image Forming Method) | | |
| Ink Set | | White Ink (duty 100%) | Color Ink | Clear Ink (duty 20%) | White Ink (duty 100%) | Color Ink | Clear Ink (duty 20%) | White Ink (duty 100%) | Color Ink | Clear Ink (duty 20%) | White Ink (duty 100%) | Color Ink | Clear Ink (duty 20%) |
| Color Material | Titanium Dioxide Pigment | 10 | | | 10 | | | 10 | | | 10 | | |
| | Cyan Pigment | | 4 | | | 4 | | | 4 | | | 4 | |
| Resin Component | Fluorene Resin (Component A) | 3 | | | 3 | | | 3 | | | 3 | | |
| | Styrene Acryl Resin (component A) | | | | | | | | | | | | |
| | Polyethylene Wax A (Component B) | | | | | | | | | | | | 8 |
| | Polyethylene Wax B (Component B) | | | 8 | | | | | | | | | |
| | Polyethylene Wax C (Component B) | | | | | | 8 | | | | | | |
| | Ethylene vinyl Acetate (Component B) | | | | | | | | | 8 | | | |
| | Urethane Resin | | 1 | | | 1 | | | 1 | | | 1 | |
| Other Component | 1,2,hexanediol | 5 | 5 | 5 | 5 | 5 | 5 | 5 | 5 | 5 | 5 | 5 | 5 |
| | 2-pyrolidone | 2 | 2 | 2 | 2 | 2 | 2 | 2 | 2 | 2 | 2 | 2 | 2 |
| | Surfactant | 1 | 1 | 1 | 1 | 1 | 1 | 1 | 1 | 1 | 1 | 1 | 1 |
| | Propylene Glycol | 8 | 10 | 12 | 8 | 10 | 12 | 8 | 10 | 12 | 8 | 10 | 12 |
| | Ion Exchange Water | Residual | Residual | Residual | Residual | Residual | Residual | Residual | Residual | Residual | Residual | Residual | Residual |
| Total (mass %) | | 100 | 100 | 100 | 100 | 100 | 100 | 100 | 100 | 100 | 100 | 100 | 100 |
| Raito | $T_{WB}/T_{WA}$ | | 0.53 | | | 0.53 | | | 0.53 | | | 0.53 | |
| Assessment Result | Ejection Stability | | B | | | A | | | A | | | A | |
| | Friction Resistance | | A | | | B | | | A | | | A | |
| | Crack | | A | | | A | | | B | | | B | |
| | Spread | | A | | | A | | | A | | | A | |

TABLE 7

|  |  | Comp. 1B | | Comp. 2B | |
| --- | --- | --- | --- | --- | --- |
| Printing Method | | White Ink→Color Ink | | White Ink→Color Ink | |
| Ink Set | | White Ink (duty 100%) | Color Ink | White Ink (duty 100%) | Color Ink |
| Color Material | Titanium Dioxide Pigment | 10 | | 10 | |
| | Cyan Pigment | | 4 | | 4 |
| Resin Component | Fluorene Resin (Component A) | 3 | | 3 | |
| | Styrene Acryl Resin (component A) | | | | |
| | Polyethylene Wax A (Component B) | 2 | | | |
| | Polyethylene Wax B (Component B) | | | | |
| | Polyethylene Wax C (Component B) | | | | |
| | Ethylene Vinyl Acetate (Component B) | | | | |
| | Urethane Resin | | 1 | | 1 |
| Other Component | 1,2-hexanediol | 5 | 5 | 5 | 5 |
| | 2-pyrolidone | 2 | 2 | 2 | 2 |
| | Surfactant | 1 | 1 | 1 | 1 |
| | Propylene Glycol | 8 | 10 | 8 | 10 |
| | Ion Exchange Water | Residual | Residual | Residual | Residual |
| Total (mass %) | | 100 | 100 | 100 | 100 |
| Raito | $T_{WB}/T_{WA}$ | 0.67 | | 0.67 | |
| Assessment Result | Ejection Stability | C | | A | |
| | Friction Resistance | B | | C | |
| | Crack | A | | D | |
| | Spread | A | | A | |

As shown in the assessment test results of Table 4 and Table 7, according to the ink sets of Example 1B to Example 10B, the cracks and spread were reduced, the images with excellent friction resistance were printed, and the ejection stability of ink was good.

In Example 1B and Example 11B, the same ink set is used, but the image forming methods thereof are different from each other. As can be seen from the assessment result of cracks, the case of using the first image forming method (Example 3B) is better than the case of using the second image forming method (Example 11B).

Meanwhile, the ink sets of Comparative Example 1B and Comparative Example 2B are not provided with the clear ink. For this reason, as shown in the assessment result of Table 7, the friction resistance of the printed image is not good.

The invention is not limited to two embodiments described above, and may be variously modified. For example, the invention includes substantially the same configuration (for example, configuration with the same function, method, and result, or configuration with the same object and effect) as the configuration described in the embodiments. The invention includes a configuration in which inessential parts of the configuration described in the embodiments are transferred. The invention includes a configuration having the same operation and effect as those of the configuration described in the embodiments or a configuration capable of achieving the same object. The invention includes a configuration in which the known art is added to the configuration described in the embodiment.

What is claimed is:

1. An ink set for ink jet printing comprising:
    a first ink that contains a white material and a first resin; and
    a second ink that contains a color material other than the white material, and a second resin,
    wherein the white material is in the range of 1-20% of the total mass of the first ink,
    wherein the first resin is in the range of 1-7% of the total mass of the first ink and is configured to fix the first ink to a printing medium,
    wherein the color material is in the range of 1-20% of the total mass of the second ink,
    wherein the second resin is in the range of 1-10% of the total mass of the second ink and is configured to fix the second ink to the first ink, and
    wherein the first resin includes fluorene resin having a fluorene structure, and the second resin includes at least one of polyolefin wax and ethylene vinyl acetate resin.

2. The ink set according to claim 1, wherein an average particle diameter of the polyolefin wax is equal to or more than 100 nm and equal to or less than 200 nm.

3. The ink set according to claim 1, wherein a content of the first resin in the first ink is equal to or more than 1 mass % and less than 6 mass %.

4. An image printing method using the ink set according to claim 1, the method comprising:
    ejecting liquid droplets of the first ink to attach the liquid droplets of the first ink to a printing medium; and
    ejecting liquid droplets of the second ink to attach the liquid droplets of the second ink onto the liquid droplets of the first ink attached to the printing medium.

5. An image printing device which prints an image comprising:
    the ink set of claim 1;
    a first nozzle which is configured to eject the first ink of the ink set to a printing medium; and
    a second nozzle which is configured to eject the second ink of the ink set onto the first ink which is attached to the printing mechanism.

* * * * *